United States Patent
Terai et al.

(10) Patent No.: US 8,432,495 B2
(45) Date of Patent: Apr. 30, 2013

(54) VIDEO PROCESSOR AND VIDEO PROCESSING METHOD

(75) Inventors: Katsumi Terai, Osaka (JP); Yoshihito Ohta, Okayama (JP); Kazushi Nozawa, Okayama (JP)

(73) Assignee: Panasonic Corporation, Osaka (JP)

( * ) Notice: Subject to any disclaimer, the term of this patent is extended or adjusted under 35 U.S.C. 154(b) by 560 days.

(21) Appl. No.: 12/440,471

(22) PCT Filed: Sep. 12, 2007

(86) PCT No.: PCT/JP2007/067748
§ 371 (c)(1),
(2), (4) Date: Mar. 9, 2009

(87) PCT Pub. No.: WO2008/032744
PCT Pub. Date: Mar. 20, 2008

(65) Prior Publication Data
US 2009/0303392 A1 Dec. 10, 2009

(30) Foreign Application Priority Data
Sep. 15, 2006 (JP) .................................. 2006-251627

(51) Int. Cl.
*H04N 5/14* (2006.01)
*H04N 11/02* (2006.01)

(52) U.S. Cl.
USPC .................. 348/699; 375/240.15; 375/240.16

(58) Field of Classification Search ............. 375/240.12, 375/240.16
See application file for complete search history.

(56) References Cited

U.S. PATENT DOCUMENTS

| | | | |
|---|---|---|---|
| 4,779,131 A | 10/1988 | Matsumoto et al. | |
| 4,992,870 A | 2/1991 | Samad | |
| 5,162,907 A | 11/1992 | Keating et al. | |
| 5,191,416 A * | 3/1993 | Dickson et al. | ............... 348/459 |
| 5,929,919 A | 7/1999 | De Haan et al. | |
| 6,219,436 B1 | 4/2001 | De Haan et al. | |
| 6,975,324 B1 | 12/2005 | Valmiki et al. | |
| 2002/0085096 A1 | 7/2002 | Mertens et al. | |
| 2003/0206246 A1 | 11/2003 | De Haan et al. | |

(Continued)

FOREIGN PATENT DOCUMENTS

| | | |
|---|---|---|
| CN | 1496114 | 5/2004 |
| CN | 1574951 | 2/2005 |

(Continued)

OTHER PUBLICATIONS

English language Abstract of JP 62-175080 A.

(Continued)

*Primary Examiner* — David Czekaj
*Assistant Examiner* — Leron Beck
(74) *Attorney, Agent, or Firm* — Greenblum & Bernstein, P.L.C.

(57) ABSTRACT

A motion compensator includes a video data selector, a video data editor, a vector reference data editor, a delay unit, a region data editor, and a delay unit. The video data editor outputs present frame video data and average video data. The vector reference data editor outputs previous compensation video data and present compensation video data. The region data editor outputs present frame region data, previous compensation region data, and present compensation region data. The video data selector selects one of four video data pieces based on the three pieces of region data and outputs the selected data to the video output unit.

15 Claims, 16 Drawing Sheets

U.S. PATENT DOCUMENTS

| | | |
|---|---|---|
| 2004/0085480 A1 | 5/2004 | Salzer et al. |
| 2004/0233326 A1 | 11/2004 | Yoo et al. |
| 2005/0168483 A1 | 8/2005 | Hirata |
| 2005/0231644 A1 | 10/2005 | Salzer et al. |
| 2005/0232357 A1 | 10/2005 | Hubrich et al. |
| 2006/0215037 A1* | 9/2006 | Tsunekawa et al. ..... 348/211.99 |
| 2007/0092111 A1 | 4/2007 | Wittebrood et al. |
| 2008/0007614 A1 | 1/2008 | Mizuhashi et al. |
| 2009/0122188 A1 | 5/2009 | Hanaoka et al. |

FOREIGN PATENT DOCUMENTS

| | | |
|---|---|---|
| CN | 1649397 | 8/2005 |
| CN | 1678024 | 10/2005 |
| CN | 1783995 | 6/2006 |
| EP | 1585326 | 10/2005 |
| EP | 1931141 A1 | 6/2008 |
| JP | 62-025588 A | 2/1987 |
| JP | 62-175080 A | 7/1987 |
| JP | 3-062689 A | 3/1991 |
| JP | 4-047785 A | 2/1992 |
| JP | 8-149421 | 6/1996 |
| JP | 9-214899 A | 8/1997 |
| JP | 2001-507552 A | 6/2001 |
| JP | 3245417 B2 | 10/2001 |
| JP | 3287864 B2 | 3/2002 |
| JP | 2003-533800 A | 11/2003 |
| JP | 2004-120757 A | 4/2004 |
| JP | 2005-217971 A | 8/2005 |
| JP | 2005-287049 A | 10/2005 |
| WO | 91/20155 | 12/1991 |
| WO | 01/88852 | 11/2001 |
| WO | 2005/027525 | 3/2005 |
| WO | 2006/013510 | 2/2006 |
| WO | 2007/040045 A1 | 4/2007 |
| WO | 2007/052452 | 5/2007 |
| WO | 2007/063465 | 6/2007 |

OTHER PUBLICATIONS

English language Abstract of JP 4-047785 A.
English language Abstract of JP 9-214899 A.
Choi et al., "New Frame Rate Up-Conversion Using Bi-directional Motion Estimation," IEEE Transactions on Consumer Electronics, vol. 46, No. 3, pp. 603-609 (Aug. 2000).
Wittebrood et al., "Tackling occlusion in scan rate conversion systems", 2003 Digest of Technical Papers International Conference on Consumer Electronics (Cat. No. 03CH37416); [International Conference on Consumer Electronics], IEEE Operations Center, US, vol. Conf. 22, Jun. 1, 2003, pp. 344-345, XP002303921, ISBN: 978-0-7803-7721-9.
Office Action issued by the European Patent Office, mailed Oct. 11, 2010.

* cited by examiner

VIDEO PROCESSOR AND VIDEO PROCESSING METHOD

TECHNICAL FIELD

The present invention relates to a video processor and a video processing method in which frame rate conversion is carried out.

BACKGROUND ART

In a video processor such as a television receiver, video data is subjected to frame rate conversion (see for example Patent Document 1). In the frame rate conversion, a motion vector is detected from two consecutive frames (screen images forming a moving image) on the time base and an interpolation frame is generated using the detected motion vector, for example. By the processing, the compression efficiency of the video data can be improved while the picture quality of the video images can be improved.
[Patent Document 1] JP 62-175080 A

DISCLOSURE OF THE INVENTION

Problems to be Solved by the Invention

In television receivers in general, characters such as a channel number can be displayed on a display panel. When characters are displayed on the display panel, the television receiver generates character data by a microcomputer included therein. The generated character data is superimposed on the video data after the frame rate conversion and the superimposed data is output as a video image.

In the frame rate conversion, an interpolation frame is generated from two consecutive frames on the time base, and therefore the frame frequency of the video data increases. For example, the video data at a frame frequency of 50 Hz is changed into video data at a frame frequency of 100 Hz by the frame rate conversion. Therefore, when the character data is superimposed after the frame rate conversion, the video data having its frame frequency increased must have character data superimposed thereon, and therefore a high performance microcomputer that operates at high processing speed must be used. This increases the product cost for the television receiver.

Therefore, the inventors considered about the way of superimposing the character data on the video data and then carrying out frame rate conversion for reduction of the product cost for the television receiver. In this case, the video data before the frame frequency increases, in other words, video data at a low frame frequency can have character data superimposed thereon. Therefore, a high performance microcomputer that operates at high processing speed is not necessary. Therefore, the product cost for the television receiver can be reduced.

However, the inventors have found that when the frame rate conversion is carried out after the character data is superimposed on the video data, the picture quality is lowered in some cases. The inventors have found a number of causes for the degradation in the picture quality. Hereinafter, problems generated during the frame rate conversion will be described by illustrating some examples of the causes.

FIGS. 15 and 16 are views showing an example of how a channel number is displayed on a display panel in the television receiver. In FIGS. 15 and 16, characters 1005 representing the channel number "31" are displayed on the display panel 1001 of the television receiver 1000. Note that in the example, three birds 1006, 1007, and 1008 move to the right in the main screen image 1002. In FIG. 15, the bird 1006 is partly occluded by the characters 1005.

Here, as described above, in the frame rate conversion, an interpolation frame is generated from two consecutive frames on the time base. Therefore, in the above-described example, a motion vector cannot be detected correctly for the part of the bird 1006 occluded by the characters 1005. Therefore, a correct interpolation frame cannot be generated.

In the frame rate conversion, the motion vector is detected on a block-basis (such as a block of 8×8 pixels). Therefore, if the boundary between the characters 1005 and the bird 1006 is present within one block, the motion vector of the block is detected based on the bird 1006 in some cases. Therefore, in the interpolation frame, part of the characters 1005 could move as the bird 1006 moves.

As a result, the picture quality is lowered in the region surrounding the characters 1005 and the bird 1006.

The inventors have found that the above-described problem is encountered when two pieces of video data are superimposed on one another and then the superimposed data is subjected to frame rate conversion. This will be described with reference to FIGS. 15 and 16.

In FIGS. 15 and 16, a main screen image 1002 based on one piece of video data and a sub screen image 1003 based on another piece of the video data are displayed on the display panel 1001. The main screen image 1002 and the sub screen image 1003 are independent from each other and the sub screen image 1003 is displayed on the main screen image 1002. Note that in FIGS. 15 and 16, an automobile 1004 travels to the left in the main screen image 1002. Therefore, the automobile 1004 partly occluded by the sub screen image 1003 in FIG. 15 gradually comes to appear on the main screen image 1002.

In this case, similarly to the above-described example, the motion vector of the part of the automobile 1004 occluded by the sub screen 1003 cannot be detected correctly. Therefore, a correct interpolation frame cannot be generated.

If the boundary between the main screen image 1002 and the sub screen image 1003 is present in one block, the motion vector of the block is sometimes detected based on the movement of the automobile 1004. In this way, in the interpolation frame, part of the sub screen image 1003 can move as the automobile 1004 moves.

As a result, the picture quality is lowered in the sub screen image 1003 and the region surrounding the sub screen image 1003.

For the above-described causes, in the structure of the conventional television receiver, the picture quality can be lowered by frame rate conversion. Therefore, it is difficult to stably provide video images with high picture quality.

It is an object of the present invention to provide a video processor and a video processing method that allow high picture quality video images to be stably provided in an inexpensive manner.

Means for Solving the Problems (1) A video processor according to one aspect of the invention processes superimposed data produced based on first data for displaying a first video image and second data for displaying a second video image on the first video image and includes a motion vector detector that detects a motion vector from superimposed data for a plurality of frames, and an interpolation data generator that generates interpolation data in an interpolation frame that interpolates between two frames based on the superimposed data for the plurality of frames and the motion vector detected by the motion vector detector. When the second video image is displayed at least in one of the two frames, the interpolation data generator generates interpolation data for a region corresponding to at least an outer peripheral part of the display region for the second video image in the interpolation frame without using the motion vector detected by the motion vector detector.

In the video processor, a motion vector is detected from superimposed data for a plurality of frames in the motion vector detector. In the interpolation data generator, interpolation data in an interpolation frame that interpolates between two frames is generated based on the superimposed data for the plurality of frames and the motion vector.

Here, when at least one of the two frames has a display region for the second video image, the interpolation data generator generates the interpolation data without using the motion vector for a region corresponding to at least the outer peripheral part of the display region for the second video image in the interpolation frame. Note that the outer peripheral part refers to a region having a prescribed width including the contour line of the display region for the second video image.

In this case, the outer peripheral part that should not be moved can be prevented from moving in the interpolation frame based on the motion vector. In this way, in the interpolation frame, the second video image can be prevented from being displayed in the region for displaying the first video image and the first video image can be prevented from being displayed in the region for displaying the second video image. Therefore, the second video image can be displayed in an appropriate position in the interpolation frame.

The interpolation data generator can generate an interpolation frame from the superimposed data of the first and second data. Therefore, before the interpolation frame is generated, in other words, before the number of frames of the first data (frame frequency) increases, the second data can be superimposed on the first data.

In this way, when for example the second data is data for an on screen display (hereinafter abbreviated as "OSD data"), the first data may have the OSD data superimposed thereon using a microcomputer whose data processing speed is lower than the case in which the OSD data is superimposed on the first data after the number of frames of the first data increases. In this way, a high performance microcomputer is not necessary in the video processor, so that the product cost for the video processor can be reduced.

Consequently, highly precise motion compensation can be carried out in an inexpensive manner. Therefore, high picture quality video images can stably be provided.

(2) When the second video image is displayed at least in one of the two frames, the interpolation data generator may generate interpolation data for all the regions of the interpolation frame without using the motion vector detected by the motion vector detector.

In this way, the second video image that should not be moved can surely be prevented from moving in the interpolation frame based on the motion vector. Therefore, in the interpolation frame, the second video image can surely be prevented from being displayed in the region for displaying the first video image and the first video image can surely be prevented from being displayed in the region for displaying the second video image. Therefore, the second video image can be displayed in an appropriate position in the interpolation frame.

(3) When the second video image is displayed at least in one of the two frames, the interpolation data generator may generate the second data as interpolation data for a region corresponding to at least the outer peripheral part of the display region for the second video image in the interpolation frame.

In this case, when the display region for the second video image is present at least in one of the two frames, a video image is also displayed based on the second data in a region at least corresponding to the above-described outer peripheral part in the interpolation frame. Therefore, when the two frames both have a display region for the second video image, a video image based on the first data can be prevented from being displayed in the region at least corresponding to the outer peripheral part in the interpolation. Consequently, more precise motion compensation can be carried out.

(4) The interpolation data generator may determine the region corresponding to at least the outer peripheral part based on the region data indicating the display region for the second video image in each frame. In this case, the region for displaying at least the above-described outer peripheral part in the interpolation frame can readily be determined based on the region data.

(5) The interpolation data generator may generate data for first and second prediction frames based on the superimposed data for the previous and present frames on the time base among the two frames and the motion vector detected by the motion vector detector, and when the region of at least the outer peripheral part in the first prediction frame and the region of at least the outer peripheral part in the second prediction frame are different, the interpolation data generator may select data in a corresponding region of one of the first and second prediction frames as interpolation data for a region corresponding to at least the outer peripheral part in the other prediction frame in an interpolation frame.

In this case, in the interpolation data generator, the first prediction frame based on the previous frame and the motion vector and the second prediction frame based on the present frame and the motion vector are generated as candidates for the interpolation frame. In the interpolation frame, for the region of the first prediction frame at least corresponding to the outer peripheral part, data in a corresponding region of the second prediction frame is used as the interpolation data and for the region of the second prediction frame at least corresponding to the outer peripheral part, data in a corresponding region of the first prediction frame is used as the interpolation data.

Therefore, the above described region of at least the outer peripheral part that should not be moved can be prevented from moving in the interpolation frame, and the interpolation data in the interpolation frame can be generated from the superimposed data for the previous or present frame based on the motion vector. Therefore, in the interpolation frame, the second video image can be displayed in an appropriate position and even more precise motion compensation can be carried out. Consequently, high picture quality video images can stably be provided.

(6) The interpolation data generator may further generate data in a third prediction frame by calculation using the superimposed data for the previous and present frames, and when the region of at least the outer peripheral part in the first prediction frame and the region of at least the outer peripheral part in the second prediction frame are equal, the interpolation data generator may select data in a corresponding region in the third prediction frame as interpolation data for regions corresponding to at least the outer peripheral part in the first and second prediction frames in an interpolation frame.

In this case, in the interpolation data generator, the third prediction frame is generated as a candidate for the interpolation frame by calculation using superimposed data in the previous frame and superimposed data in the present frame. In the interpolation frame, data in the corresponding region of the third prediction frame is used as the interpolation data for both regions at least corresponding to the outer peripheral part of the first prediction frame and the outer peripheral part of the second prediction frame.

Therefore, the above-described region of at least the outer peripheral part that should not be moved can surely be prevented from moving in the interpolation frame while the interpolation data in the interpolation frame can be generated from the superimposed data for the previous and present frames. In this way, in the interpolation frame, the second video image can be displayed in an appropriate position and even more precise motion compensation can be carried out. Consequently, high picture quality video images can stably be provided.

(7) The video processor may further include a prediction region data generator that generates first prediction region data indicating the display region for the second video image in the first prediction frame based on region data indicating the display region for the second video image in the previous frame and the motion vector detected by the motion vector detector, and second prediction region data indicating the display region for the second video image in the second prediction frame based on region data indicating the display region for the second video image in the present frame and the motion vector detected by the motion vector detector, and the interpolation data generator may generate interpolation data based on the first and second prediction region data generated by the prediction region data generator.

In this way, in the prediction region data generator, the first prediction region data indicating the display region for the second video image in the first prediction frame is generated based on the region data in the previous frame and the motion vector, and the second prediction region data indicating the display region for the second video image in the second prediction frame is generated based on the region data in the present frame and the motion vector. Therefore, the interpolation data generator can readily identify at least the region of the outer peripheral part in the first and second prediction frames based on the first and second prediction region data.

In this way, at least the region of the above-described outer peripheral part that should not be moved can surely be prevented from moving in the interpolation frame, and the interpolation data in the interpolation frame can readily be generated from the superimposed data for the previous and present frames. Consequently, the second video image can be displayed in a more appropriate position in the interpolation frame and even more precise motion compensation can be carried out.

(8) The second data may be data for an on screen display, and the region of at least the outer peripheral part may include all the regions for the on screen display.

In this case, before the interpolation frame is generated, in other words, before the number of frames of the first data (frame frequency) increases, the first data can have the data for an on screen display (hereinafter abbreviated as "OSD data") superimposed thereon.

Therefore, the first data may have the OSD data superimposed thereon using a microcomputer whose data processing speed is lower than the case in which the first data has the OSD data superimposed thereon after the number of frames of the first data increases. In this way, a high performance microcomputer is not necessary in the video processor, so that the product cost for the video processor can be reduced.

The interpolation data is generated without using the motion vector for the region for an on screen display.

In this case, the region for the on screen display that should not be moved can be prevented from moving in the interpolation frame based on the motion vector. Therefore, in the interpolation frame, an on screen display can be prevented from being provided in the region in which the on screen display should not be provided and the first video image can be prevented from being displayed in the region for an on screen display. Therefore, an on screen display can be provided in an appropriate position in the interpolation frame.

(9) A video processor according to another aspect of the invention processes first data for displaying a first video image and second data for displaying a second video image and includes a superimposed data generator that generates superimposed data for a plurality of frames in which the second video image is displayed on the first video image by superimposing the second data on the first data, a motion vector detector that detects a motion vector from the first data for the plurality of frames, and an interpolation data generator that generates interpolation data in an interpolation frame that interpolates between two frames based on the superimposed data for the plurality of frames generated by the superimposed data generator and the motion vector detected by the motion vector detector.

In the video processor, the second data for displaying the second video image is superimposed on the first data for displaying the first video image to form the superimposed data in the superimposed data generator. In the motion vector detector, a motion vector is detected from the first data for the plurality of frames. In the interpolation data generator, the interpolation data in the interpolation frame that interpolates between two frames is generated based on the superimposed data for the plurality of frames and the motion vector.

Therefore, the motion vector is detected from the first data. If the second video image is displayed on the first video image, the motion vector can be detected with no consideration given to the second data.

In this way, in the plurality of frames of the superimposed data, precise matching can be carried out between the two frames for the first video image in the region that is not displayed because of the second video image. Therefore, the motion vector can be detected highly precisely for the first video image.

The interpolation data generator can generate the interpolation frame from the superimposed data of the first and second data. Therefore, before the interpolation frame is generated, in other words, before the frame number of the first data (frame frequency) increases, the second data can be superimposed on the first data.

In this way, if for example the second data is OSD data, the first data can have the OSD data superimposed thereon using a microcomputer whose data processing speed is lower than the case in which the first data has the OSD data superimposed thereon after the number of frames of the first data is increased. In this case, a high performance microcomputer is not necessary in the video processor, so that the product cost for the video processor can be reduced.

Consequently, highly precise motion compensation can be carried out in an inexpensive manner. Therefore, high picture quality video images can stably be provided.

(10) When the second video image is displayed at least in one of the two frames, the interpolation data generator may generate interpolation data for a region corresponding to the display region for the second video image in the interpolation frame without using the motion vector detected by the motion vector detector.

In this way, the display region for the second video image that should not be moved can be prevented from moving in the interpolation frame based on the motion vector. Therefore, in the interpolation frame, the second video image can be prevented from being displayed in the region for displaying the first video image and the first video image can be prevented from being displayed in the region for displaying the second video image. Therefore, the second video image can be displayed in an appropriate position in the interpolation frame.

(11) When the second video image is displayed at least in one of the two frames, the interpolation data generator may generate interpolation data for all the regions of the interpolation frame without using the motion vector detected by the motion vector detector.

In this way, the second video image that should not be moved can surely be prevented from moving in the interpolation frame based on the motion vector. Therefore, in the interpolation frame, the second video image can surely be prevented from being displayed in the region for displaying the first video image and the first video image can surely be prevented from being displayed in the region for displaying the second video image. Therefore, the second video image can be displayed in an appropriate position in the interpolation frame.

(12) When the second video image is displayed at least in one of the two frames, the interpolation data generator may generate the second data as interpolation data in a region corresponding to the display region for the second video image in the interpolation frame.

In this way, when the display region for the second video image is present at least in one of the two frames, the video image based on the second data is also displayed in the region of the interpolation frame corresponding to at least the outer peripheral part. Therefore, when the two frames both have the display region for the second video image, the video image based on the first data can be prevented from being displayed in the region of the interpolation frame at least corresponding to the outer peripheral part. Consequently, more precise motion compensation can be carried out.

(13) The interpolation data generator may determine a region corresponding to the display region for the second video image based on region data indicating the display region for the second video image in each frame. In this way, the display region for the second video image in the interpolation frame can readily be determined based on the region data.

(14) The interpolation data generator may generate data in first and second prediction frames based on the superimposed data for the previous and present frames on the time base among the two frames and the motion vector detected by the motion vector detector, and when the display region for the second video image in the first prediction frame and the display region for the second video image in the second prediction frame are different, the interpolation data generator may select, as interpolation data in the region corresponding to the display region for the second video image in one of the first and second prediction frames in the interpolation frame, data in the corresponding region of the other prediction frame.

In this way, in the interpolation data generator, the first prediction frame based on the previous frame and the motion vector and the second prediction frame based on the present frame and the motion vector are generated as candidates for the interpolation frame. In the interpolation frame, for the region of the first prediction frame corresponding to the display region for the second video image, data in a corresponding region of the second prediction frame is used as the interpolation data, and for the region of the second prediction frame corresponding to the display region for the second video, data in a corresponding region of the first prediction frame is used as the interpolation data.

Therefore, the display region for the second video image that should not be moved can be prevented from moving in the interpolation frame, while the interpolation data in the interpolation frame can be generated from the superimposed data of the previous or present frame based on the motion vector. In this way, in the interpolation frame, the second video image can be displayed in an appropriate position and more precise motion compensation can be carried out. Consequently, high picture quality video images can stably be provided.

(15) The interpolation data generator may further generate data in a third prediction frame by calculation using the superimposed data for the previous and present frames, and when the display region for the second video image in the first prediction frame and the display region for the second video image in the second prediction frame are equal, in the interpolation frame, the interpolation data generator may select data in a corresponding region of said third prediction frame as interpolation data for regions corresponding to the display regions for said second video image in said first and second prediction frames.

In this case, in the interpolation data generator, the third prediction frame is generated as a candidate for the interpolation frame by calculation using superimposed data for the previous frame and superimposed data for the present frame. In the interpolation frame, data in the corresponding region of the third prediction frame is used as the interpolation data for both regions corresponding to the display region for the second video image in the first prediction frame and the display region for the second video image in the second prediction frame.

Therefore, the display region for the second video image that should not be moved can surely be prevented from moving in the interpolation frame, while the interpolation data in the interpolation frame can be generated from the superimposed data for the previous and present frames. In this way, in the interpolation frame, the second video image can be displayed in an appropriate position and more precise motion compensation can be carried out. Consequently, high picture quality video images can stably be provided.

(16) The video processor may further include a prediction region data generator that generates first prediction region data indicating the display region for the second video image in the first prediction frame based on region data indicating the display region for the second video image in the previous frame and the motion vector detected by the motion vector detector, and second prediction region data indicating the display region for the second video image in the second prediction frame based on region data indicating the display region for the second video image in the present frame and the motion vector detected by the motion vector detector, and the interpolation data generator may generate interpolation data based on the first and second prediction region data generated by the prediction region data generator.

In this way, in the prediction region data generator, the first prediction region data indicating the display region for the second video image in the first prediction frame is generated based on the region data in the previous frame and the motion vector, and the second prediction region data indicating the display region for the second video image in the second prediction frame is generated based on the region data in the present frame and the motion vector. Therefore, the interpolation data generator can readily identify the display region for the second video image in the first and second prediction frames based on the first and second prediction region data.

Therefore, the display region for the second video image that should not be moved can surely be prevented from moving in the interpolation frame, and the interpolation data in the interpolation frame can readily be generated from the superimposed data for the previous and present frames. Therefore, the second video image can be displayed in a more appropriate position in the interpolation frame and even more precise motion compensation can be carried out.

(17) The second data may be data for an on screen display. In this case, before the interpolation frame is generated, in other words, before the frame number of the first data (frame frequency) increases, the first data can have the data for the on screen display (hereinafter abbreviated as "OSD data") superimposed thereon.

In this way, the OSD data can be superimposed on the first data using a microcomputer whose data processing speed is lower than the case in which the first data has the OSD data superimposed thereon after the number of frames of the first data is increased. In this case, a high performance microcomputer is not necessary in the video processor, so that the product cost for the video processor can be reduced.

(18) A video processor according to another aspect of the invention processes superimposed data produced based on first data for displaying a first video image and second data for displaying a second video image on the first video image and includes an interpolation data generator that generates interpolation data for an interpolation frame that interpolates between two frames based on superimposed data for a plurality of frames, and a video corrector that corrects video images in the plurality of frames and the interpolation frame, and the video corrector is prevented from correcting the second video image or sets a lower video correction ratio for the second video image than that for the first video image in a frame in which the second video image is displayed among the plurality of frames and the interpolation frame.

In the video processor, in the interpolation data generator, the interpolation data in the interpolation frame that interpolates between the two frames can be generated from the superimposed data for the plurality of frames. In the video corrector, the plurality of frames and the interpolation frame are subjected to video correction.

Here, in the frame in which the second video image is displayed among the plurality of frames and the interpolation frame, the video corrector is prevented from carrying out video correction in the display region for the second video image or sets a lower video correction ratio for the second video image than that for the first video image. In this way, when the frame in which the second video image is displayed is subjected to video correction, the display region for the second video image can be prevented from being subjected unnecessary picture quality correction. Therefore, the picture quality of the second video image can be prevented from being degraded. The elements of the second video image (second data) can be prevented from being reflected on the first video image after the correction. Therefore, the picture quality of the first video image after the video correction can be prevented from being degraded.

The interpolation data generator can generate the interpolation frame from the superimposed data of the first and second data. Therefore, before the interpolation frame is generated, in other words, before the number of frames of the first data (frame frequency) increases, the second data can be superimposed on the first data.

In this way, when for example the second data is data for an on screen display (hereinafter abbreviated as "OSD data"), the first data may have the OSD data superimposed thereon using a microcomputer whose data processing speed is lower than the case in which the first data has the OSD data superimposed thereon after the number of frames of the first data increases. In this way, a high performance microcomputer is not necessary in the video processor, so that the product cost for the video processor can be reduced.

Consequently, high picture quality video images can stably be provided in an inexpensive manner.

(19) The video corrector may carry out video correction without using the second data in the frame in which the second video image is displayed.

In this way, the elements of the second video image (second data) can surely be prevented from being reflected on the first video image after the correction. Therefore, the picture quality of the first video image after the video correction can surely be prevented from being degraded.

(20) The video corrector may extract a feature quantity in the plurality of frames and the interpolation frame based on the superimposed data and the interpolation data, subject the plurality of frames and the interpolation frame to video correction based on the extracted feature quantity, and extract the feature quantity without using the second data in a frame in which the second video image is displayed.

In this way, the plurality of frames and the interpolation frame are subjected to video correction based on the feature quantity, so that the picture quality in the plurality of frames and the interpolation frame can sufficiently be improved.

Furthermore, the second data is not used for extracting the feature quantity in the frame in which the second video image is displayed. In this way, when the frame in which the second video image is displayed is subjected to video correction, the elements of the second video image (second data) can be prevented from being reflected on the first video image after the correction. Therefore, the picture quality of the first video image after the video correction can surely be prevented from being degraded.

(21) A video processing method according to yet another aspect of the invention processes superimposed data produced based on first data for displaying a first video image and second data for displaying a second video image on the first video image and includes the steps of detecting a motion vector from superimposed data for a plurality of frames, and generating interpolation data in an interpolation frame that interpolates between two frames based on the superimposed data for the plurality of frames and the motion vector. In the step of generating the interpolation data, when the second video image is displayed at least in one of the two frames, interpolation data for a region corresponding to at least an outer peripheral part of the display region for the second video image in the interpolation frame is generated without using the motion vector detected by the motion vector detector.

In the video processing method, the motion vector is detected from the superimposed data for the plurality of frames. The interpolation data in the interpolation frame that interpolates between two frames is generated based on the superimposed data for the plurality of frames and the motion vector.

Here, when at least one of the two frames has the display region for the second video image, the interpolation data is generated without using the motion vector for the region of the display region for the second video image corresponding to at least the outer peripheral part in the interpolation frame.

In this way, the outer peripheral part that should not be moved can be prevented from moving in the interpolation frame based on the motion vector. Therefore, in the interpolation frame, the second video image can surely be prevented from being displayed in the region for displaying the first video image and the first video image can surely be prevented from being displayed in the region for displaying the second video image. Therefore, the second video image can be displayed in an appropriate position in the interpolation frame.

The interpolation frame can be generated from the superimposed data of the first and second data. Therefore, before the interpolation frame is generated, in other words, before the number of frames of the first data (frame frequency) increases, the first data can have the second data superimposed thereon.

In this way, when for example the second data is data for an on screen display (hereinafter abbreviated as "OSD data"), the first data may have the OSD data superimposed thereon using a microcomputer whose data processing speed is lower than the case in which the first data has the OSD data superimposed thereon after the number of frames of the first data increases. In this way, a high performance microcomputer is not necessary.

Consequently, highly precise motion compensation can be carried out in an inexpensive manner. Therefore, high picture quality video images can stably be provided.

(22) A video processing method according to a further aspect of the invention is a method for processing first data for displaying a first video image and second data for displaying a second video image and includes the steps of generating superimposed data for a plurality of frames in which the second video image is displayed on the first video image by superimposing the second data on the first data, detecting a motion vector from the first data for the plurality of frames, and generating interpolation data in an interpolation frame that interpolates between two frames based on the superimposed data for the plurality of frames and the motion vector.

In the video processing method, the second data for displaying the second video image is superimposed on the first data for displaying the first video image and thus the superimposed data is generated. The motion vector is detected from the first data for the plurality of frames. The interpolation data in the interpolation frame that interpolates between the two frames is generated based on the superimposed data for the plurality of frames and the motion vector.

In this way, the motion vector is detected from the first data. Therefore, the motion vector can be detected with no consideration given to the second data even if the second video image is displayed on the first video image.

In this way, in the plurality of frames of the superimposed data, precise matching can be carried out between the two frames for the first video image in the region that is not displayed because of the second video image. Therefore, the motion vector can be detected highly precisely for the first video image.

The interpolation frame can be generated from the superimposed data of the first and second data. Therefore, before the interpolation frame is generated, in other words, before the frame number of the first data (frame frequency) increases, the second data can be superimposed on the first data.

In this way, if for example the second data is OSD data, the first data can have the OSD data superimposed thereon using a microcomputer whose data processing speed is lower than the case in which the first data has the OSD data superimposed thereon after the number of frames of the first data is increased. In this case, a high performance microcomputer is not necessary.

Consequently, highly precise motion compensation can be carried out in an inexpensive manner. Therefore, high picture quality video images can stably be provided.

Effects of the Invention

According to the invention, when at least one of the two frames has the display region for the second video image, the interpolation data is generated without using the motion vector for the region at least corresponding to the outer peripheral part of the display region for the second video image in the interpolation frame. In this way, in the interpolation frame, the second video image can surely be prevented from being displayed in the region for displaying the first video image and the first video image can surely be prevented from being displayed in the region for displaying the second video image.

The interpolation frame can be generated from the superimposed data of the first and second data. Therefore, before the interpolation frame is generated, in other words, before the number of frames of the first data (frame frequency) increases, the second data can be superimposed on the first data.

In this way, when for example the second data is data for an on screen display (hereinafter abbreviated as "OSD data"), the first data may have the OSD data superimposed thereon using a microcomputer whose data processing speed is lower than the case in which the first data has the OSD data superimposed thereon after the number of frames of the first data increases. In this way, a high performance microcomputer is not necessary in the video processor, so that the product cost for the video processor can be reduced.

The motion vector can be detected from the first data. Therefore, if the second video image is displayed on the first display image, the motion vector can be detected with no consideration given to the second data. In this case, in the plurality of frames of the superimposed data, precise matching can be carried out between the two frames for the first video image in the region that is not displayed because of the second video image. Therefore, the motion vector can be detected highly precisely for the first video image.

In the frame in which the second video image is displayed, the second video image is not subjected to video correction or a lower video correction ratio is set for the second video image than that for the first video image. In this way, when the frame in which the second video image is displayed is subjected to video correction, the display region for the second video image can be prevented from being subjected to unnecessary picture quality correction. Therefore, the picture quality of the second video image can be prevented from being degraded. The elements of the second video image (second data) can be prevented from being reflected on the first video image after the correction. Therefore, the picture quality of the first video image after the video correction can be prevented from being degraded.

Consequently, high picture quality video images can stably be provided.

BEST MODE FOR CARRYING OUT THE INVENTION

Now, television receivers that receive digital signals will be described as examples of video processors according to embodiments of the invention with reference to the accompanying drawings.

(1) First Embodiment (A) Structure of Television Receiver

Figure 1:
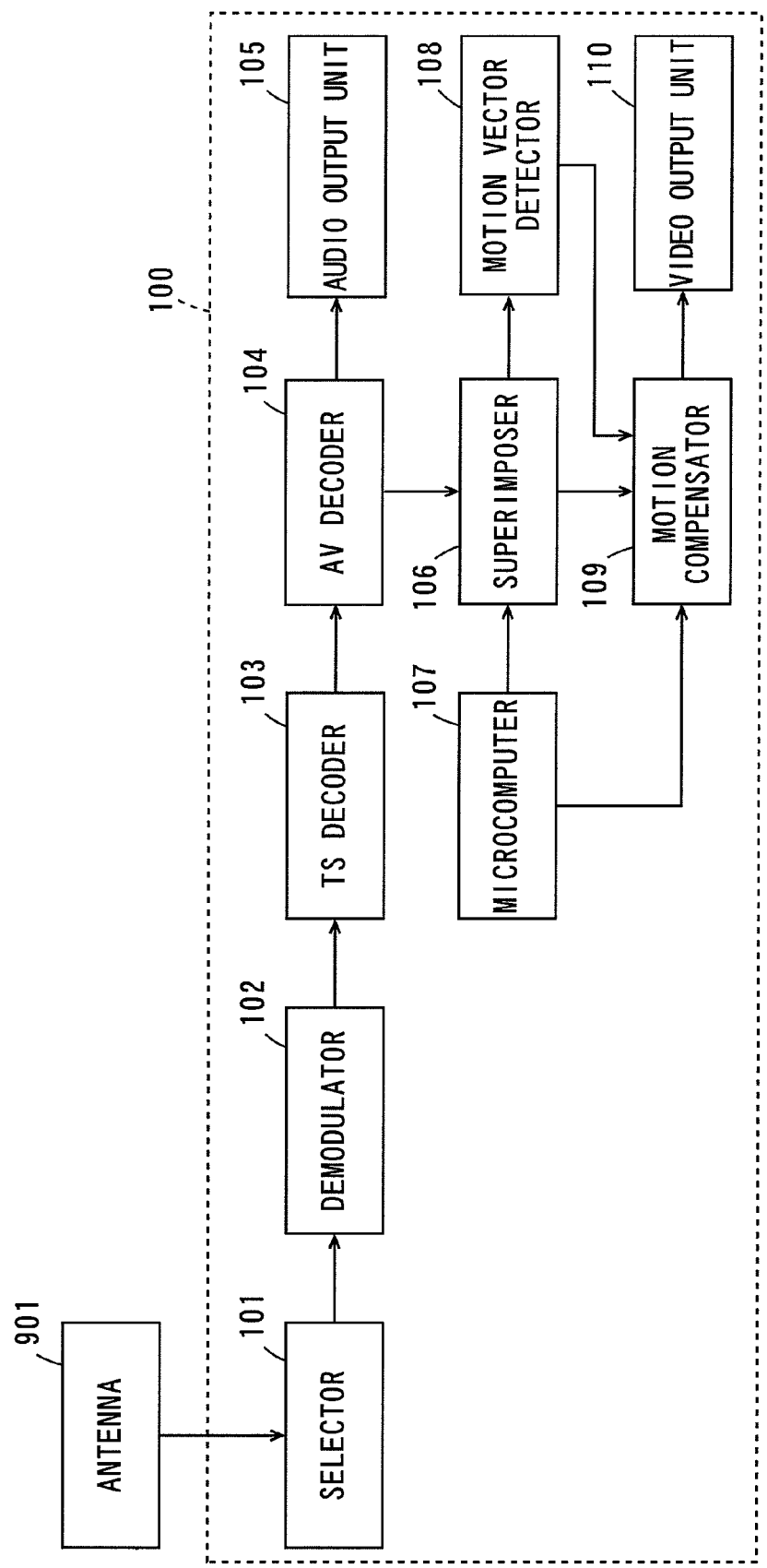
FIG. 1 is a block diagram of the structure of a television receiver according to a first embodiment.

FIG. 1 is a block diagram of the structure of a television receiver according to a first embodiment of the invention. Note that in the description of the first embodiment, frame rate conversion is carried out while characters (such as a channel number) are presented as an OSD (On Screen Display) on a screen.

As shown in FIG. 1, the television receiver 100 according to the embodiment includes a selector 101, a demodulator 102, a TS (Transport Stream) decoder 103, an AV (audiovisual) decoder 104, an audio output unit 105, a superimposer 106, a microcomputer 107, a motion vector detector 108, a motion compensator 109, and a video output unit 110.

A plurality of digital broadcasting signals (hereinafter simply as "broadcasting signals") are input to the selector 101 from an antenna 901. The selector 101 selects one of the plurality of broadcasting signals and outputs the selected broadcasting signal to the demodulator 102.

The demodulator 102 demodulates the broadcasting signal output from the selector 101 and generates a transport stream according to the MPEG (Motion Picture Experts Group)-2 standard. The demodulator 102 outputs the generated transport stream to the TS decoder 103.

The TS decoder 103 separates an audio stream and a video stream from the transport stream output from the demodulator 102. The TS decoder 103 outputs the separated audio stream and video stream to the AV decoder 104.

The AV decoder 104 decodes the audio stream and video stream output from the TS decoder 103 and generates audio data and video data. The AV decoder 104 outputs the generated audio data to the audio output unit 105 and the generated video data to the superimposer 106.

The audio output unit 105 includes an audio output device such as a speaker and outputs the audio data output from the AV decoder 104 as an audio sound.

A microcomputer 107 generates character data and outputs the generated character data to the superimposer 106. The microcomputer 107 generates region data and outputs the generated region data to the motion compensator 109. Note that the region data in the embodiment refers to information that indicates the region in which characters are displayed and indicates whether each pixel represents part of the characters.

When the microcomputer 107 outputs character data, the superimposer 106 superimposes the character data on the video data output from the AV decoder 104. The video data having the character data superimposed thereon is output to the motion vector detector 108 and the motion compensator 109.

If the microcomputer 107 does not output character data, the superimposer 106 directly outputs the video data output from the AV decoder 104 to the motion vector detector 108 and the motion compensator 109.

The motion vector detector 108 detects a motion vector each for a predetermined block (such as a pixel region of 8×8 pixels) for the video data output from the superimposer 106 and outputs the motion vector data of each pixel to the motion compensator 109.

The motion compensator 109 carries out frame rate conversion to the video data output from the superimposer 106 based on the motion vector data output from the motion vector detector 108 and the region data output from the microcomputer 107.

The motion compensator 109 outputs the video data after the frame rate conversion to the video output unit 110. Note that in the frame rate conversion, the motion compensator 109 generates data in a frame (interpolation frame) that interpolates between two consecutive frames on the time base. The motion compensator 109 will be detailed later.

The video output unit 110 includes a video display device such as a liquid crystal display panel and a plasma display panel and displays the video data output from the motion compensator 109 as a video image. Note that when video data having character data superimposed thereon is displayed as a video image, the characters are presented as an OSD at the video display device.

(B) Motion Compensation

Now, a method of generating an interpolation frame in the motion compensator 109 will be described in detail with reference to the drawings.

(b-1) Structure of Motion Compensator

To start with, the structure of the motion compensator 109 will be described.

Figure 2:
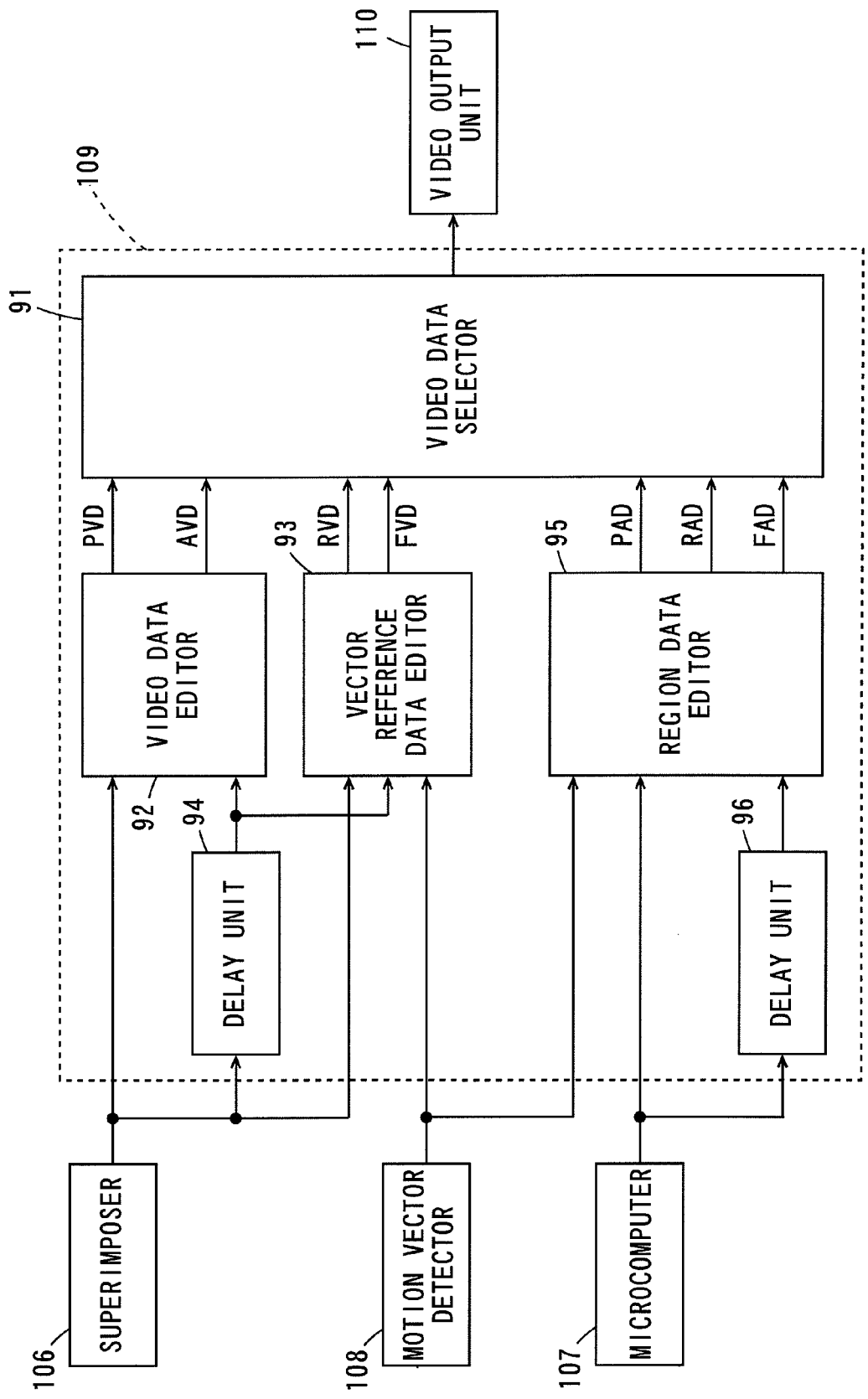
FIG. 2 is a block diagram of the structure of a main part of a motion compensator.

FIG. 2 is a block diagram of the structure of a main part of the motion compensator 109. As shown in FIG. 2, the motion compensator 109 includes a video data selector 91, a video data editor 92, a vector reference data editor 93, a delay unit 94, a region data editor 95, and a delay unit 96. The video data editor 92, the vector reference data editor 93, and the region data editor 95 are each provided with two frame memories.

Video data output from the superimposer 106 is input to one frame memory of the video data editor 92, one frame memory of the vector reference data editor 93 and the delay unit 94.

Motion vector data output from the motion vector detector 108 is input to the vector reference data editor 93 and the region data editor 95. The region data output from the microcomputer 107 is input to one frame memory in the region data editor 95, and the delay unit 96.

The delay unit 94 delays the input video data by one frame and outputs the data to the other frame memory of the video data editor 92 and the other frame memory of the vector reference data editor 93. More specifically, these frame memories of the video data editor 92 and the vector reference data editor 93 are provided with video data one frame before the video data input to the previously mentioned frame memories of the video data editor 92 and the vector reference data editor 93. Hereinafter, the frame produced by the video data input to one frame memory of each of the video data editor 92 and the vector reference data editor 93 is referred to as "present frame" and the frame produced by the video data input to the other frame memory is referred to as "previous frame."

The delay unit 96 delays input region data by one frame and outputs the data to the other frame memory of the region editor 95. More specifically, this frame memory of the region data editor 95 is provided with region data one frame before the region data input to the previously mentioned frame memory of the region data editor 95.

Note that the region data stored in one frame memory of the region data editor 95 indicates the pixel region in which characters are displayed in the present frame and the region data stored in the other frame memory indicates the pixel region in which the characters are displayed in the previous frame. Hereinafter, the region data input to one frame memory of the region data editor 95 is referred to as region data in the present frame and the region data input to the other frame memory is referred to as region data in the previous frame.

The video data editor 92 directly outputs the video data in the present frame stored in one frame memory to the video data selector 91 as present frame video data PVD.

The video data editor 92 generates average video data AVD from the video data in the present frame stored in one frame memory and the video data in the previous frame stored in the other frame memory and outputs the data to the video data selector 91. Note that in the frame generated by the average video data AVD, the luminance of each pixel is the average luminance of the pixels in the same position in the present frame and the previous frame.

The vector reference data editor 93 generates present compensation video data RVD based on the video data in the present frame stored in one frame memory and the motion vector data output from the motion vector detector 108 and outputs the data to the video data selector 91. The present compensation video data RVD will be detailed later.

Furthermore, the vector reference data editor 93 generates previous compensation video data FVD based on the video data in the previous frame stored in the other frame memory and the motion vector data output from motion vector detector 108 and outputs the generated data to the video data selector 91. The previous compensation video data FVD will be detailed later.

The region data editor 95 directly outputs the region data in the present frame stored in one frame memory as the present frame region data PAD to the video data selector 91.

The region data editor 95 generates present compensation region data RAD based on the region data in the present frame stored in one frame memory and the motion vector data output from the motion vector detector 108 and outputs the generated data to the video data selector 91. The present compensation region data RAD will be detailed later.

Furthermore, the region data editor 95 generates previous compensation region data FAD based on region data in the previous frame stored in the other frame memory and the motion vector data output from the motion vector detector 108 and outputs the generated data to the video data selector 91. The previous compensation region data FAD will be detailed later.

The video data selector 91 selects one of the four pieces of video data PVD, AVD, RVD, and FVD based on the three kinds of region data PAD, RAD, and FAD output from the region data editor 95 and outputs the selected data to the video output unit 110. Note that video data is selected for each pixel in the video data selector 91. A method of selecting video data by the video data selector 91 will be detailed later.

(b-2) Method of Generating Interpolation Frame

Now, a method of generating an interpolation frame in the motion compensator 109 will be described.

Figure 3:
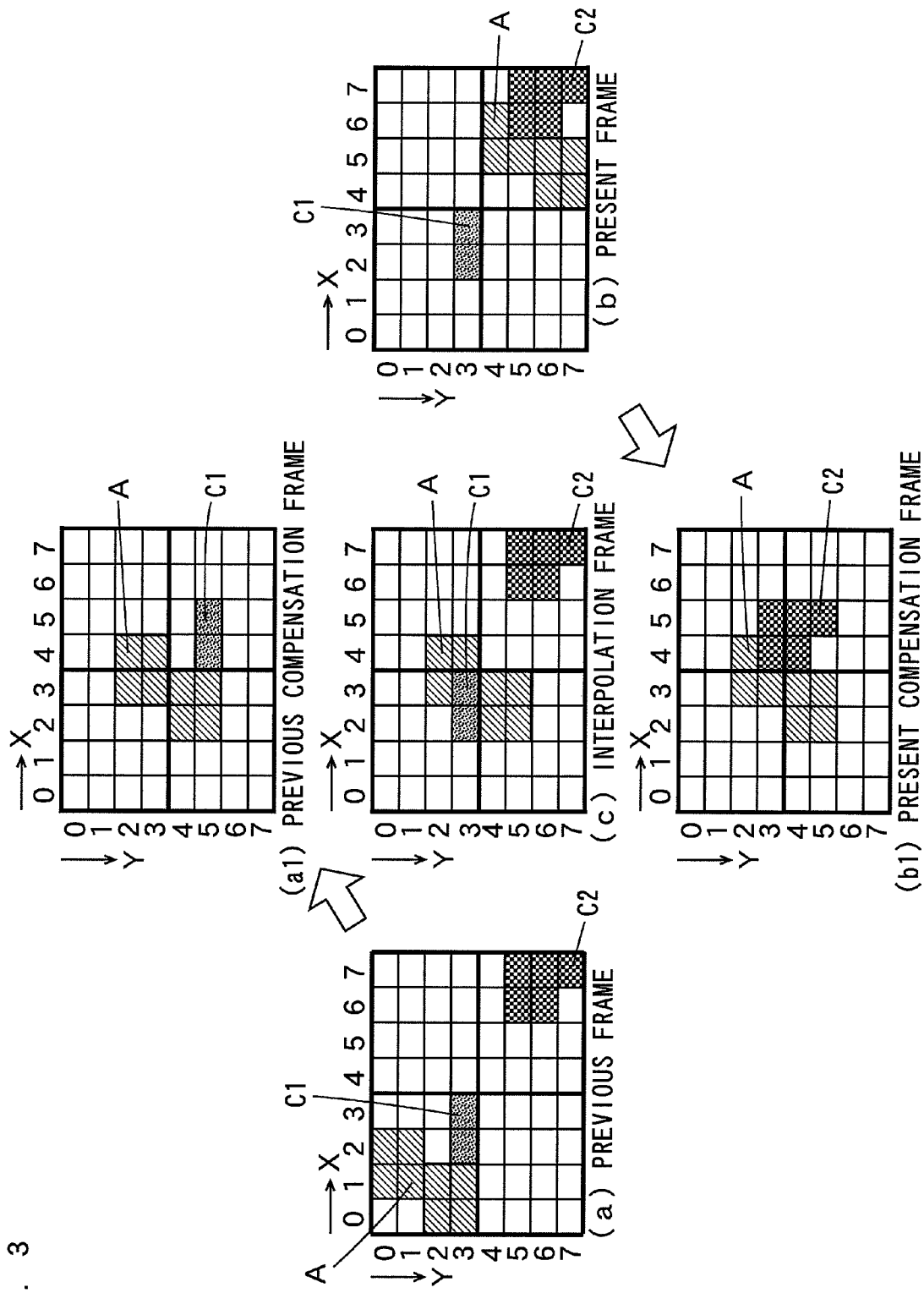
FIG. 3 is a view for use in illustrating a method of generating an interpolation frame.

FIG. 3 is a view for use in illustrating the method of generating an interpolation frame. In FIG. 3, (a) shows one region of the previous frame (a pixel region of 8×8 pixels) generated based on video data output from the superimposer 106, (b) shows one region of the present frame, and (c) shows an interpolation frame generated by the motion compensator 109.

FIG. 3(a1) shows a frame generated by moving the video data of each pixel in the previous frame (FIG. 3(a)) based on motion vector data (hereinafter referred to as "previous compensation frame"). FIG. 3(b1) shows a frame generated by moving the video data of each pixel in the present frame (FIG. 3(b)) based on motion vector data (hereinafter referred to as "present compensation frame").

More specifically, the previous compensation frame (FIG. 3(a1)) is a frame generated by the previous compensation video data FVD described in connection with FIG. 2 and the present compensation frame (FIG. 3(b1)) is a frame generated by the present compensation video data RVD also described in connection with FIG. 2. FIG. 3(b) is the present frame and therefore corresponds to a frame generated by the present frame video data PVD. Although not shown, in a frame generated by the average video data AVD (FIG. 2), the luminance of each pixel is the average luminance of corresponding pixels in the previous frame (FIG. 3(a)) and the present frame (FIG. 3(b)).

Note that in this example, the motion vector detector 108 detects a motion vector on the basis of 4×4 pixels as one block for the ease of description. The position of each pixel is represented by the X and Y coordinates.

In the example in FIG. 3, in the previous frame (FIG. 3(a)), a moving object A is indicated by eight pixels in the upper left block and a character C1 is represented by two pixels and a character C2 is represented by five pixels in the lower right block. In the present frame (FIG. 3(b)), the character C1 is represented by two pixels in the upper left block, and the moving object A is represented by seven pixels in the lower right block and the character C2 is represented by five pixels.

More specifically, in FIG. 3, the moving object A consisting of eight pixels moves from the upper left block to the lower right block between the previous frame and the present frame. In the lower right block in the present frame, part of the moving object A (positioned at (x, y)=(6, 5) in the frame shown in (b)) is occluded by the character C2. Assume that video data of pixels other than the region in which the moving object A is displayed is unchanged.

Now, assume that the motion vector detector 108 detects a motion vector (+4 in the X-direction and +4 in the Y-direction) representing the movement of video data of each pixel in the upper left block to the lower right block between the previous frame (FIG. 3(a)) and the present frame (FIG. 3(b)).

In this case, a frame that interpolates between the previous frame (FIG. 3(a)) and the present frame (FIG. 3(b)) is generated by moving the video data of each pixel in the upper left block in the previous frame by +2 in the X-direction and +2 in the Y-direction or the video data of each pixel in the lower right block in the present frame by −2 in the X-direction and −2 in the Y-direction.

However, in the example in FIG. 3, in the previous and present frames, the character C1 is present in the upper left block and the character C2 is present in the lower right block. Therefore, when the video data of each pixel in the upper left block in the previous frame is moved by +2 in the X-direction and +2 in the Y-direction, the character C1 that should not be moved moves together with the moving member A in the previous compensation frame (FIG. 3(a1)).

When the video data of each pixel in the lower right block in the present frame is moved by −2 in the X-direction and −2 in the Y-direction, the character C2 that should not be moved moves together with the moving object A in the present compensation frame (FIG. 3(b1)).

Therefore, when the present compensation video data RVD (present compensation frame) and the previous compensation video data FVD (previous compensation frame) described in connection with FIG. 2 are directly used as video data in the interpolation frame, the characters C1 and C2 that should not be moved move and the picture quality is degraded in some cases.

Therefore, according to the embodiment, the video data selector 91 (FIG. 2) selects one of the four pieces of video data PVD, AVD, RVD, and FVD for each pixel depending on the display position of the characters and outputs the selected data to the video output unit 110 (FIG. 2). In this way, the picture quality in the interpolation frame can be prevented from being degraded.

Now, a method of selecting video data by the video data selector 91 (FIG. 2) will be described. The three pieces of region data PAD, RAD, and FAD (FIG. 2) as data related to the display positions of characters will be described with reference to the drawings.

Figure 4:
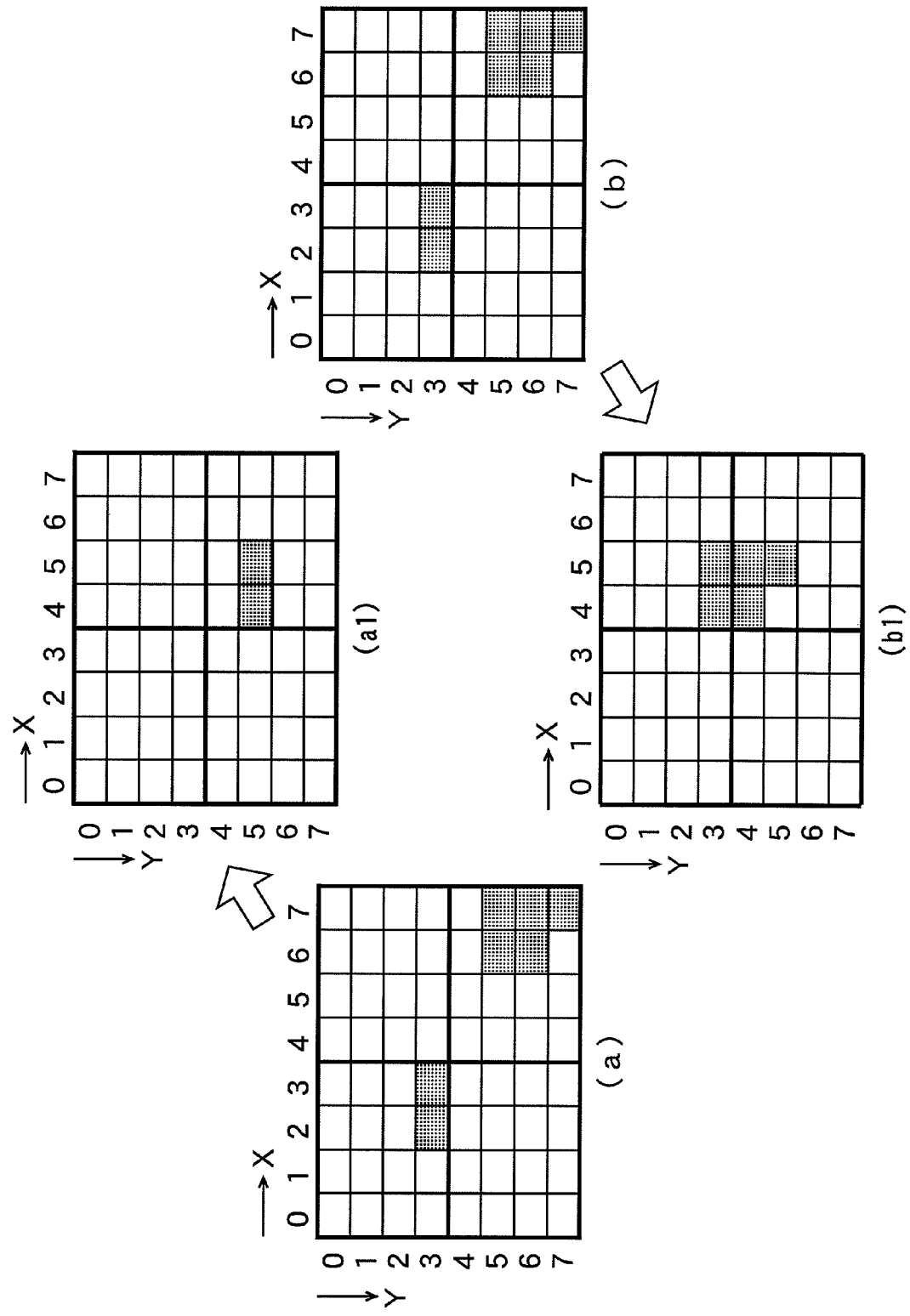
FIG. 4 is a view for use in illustrating region data.

FIG. 4 is a view for use in illustrating the region data PAD, RAD, and FAD.

In FIG. 4, (a) conceptually illustrates the state of each pixel represented by region data in the previous frame and (b) conceptually illustrates the state of each pixel represented by region data in the present frame. More specifically, FIG. 4(a) conceptually illustrates the state of each pixel represented by region data input to the region data editor 95 (FIG. 2) from the delay unit 96 (FIG. 2), and FIG. 4(b) conceptually illustrates the state of each pixel represented by region data input to the region data editor 95 from the microcomputer 107 (FIG. 2) and the present frame region data PAD (FIG. 2).

In the example in FIG. 4(a), the region data indicates that pixels at (x, y)=(2, 3), (3, 3), (6, 5), (6, 6), (7, 5), (7, 6), and (7, 7) represent the characters, and the pixels other than these pixels do not represent any character. More specifically, the region data in the example indicates that in the previous frame (FIG. 3(a)), pixels at (x, y)=(2, 3), (3, 3), (6, 5), (6, 6), (7, 5), (7, 6), and (7, 7) represent the characters.

Similarly, in the example in FIG. 4(b), the region data indicates that pixels at (x, y)=(2, 3), (3, 3), (6, 5), (6, 6), (7, 5), (7, 6), and (7, 7) represent the characters, and the pixels other than these pixels do not display any character. More specifically, the region data in the example (the present frame region data PAD) indicates that in the present frame (FIG. 3(b)), pixels at (2, 3), (3, 3), (6, 5), (6, 6), (7, 5), (7, 6), and (7, 7) represent the characters.

FIG. 4(a1) conceptually illustrates the state of each pixel represented by region data when the region data of each pixel in the upper left block is moved by +2 in the X-direction and +2 in the Y-direction from the position shown in FIG. 4(a) similarly to FIG. 3(a1).

Furthermore, FIG. 4(b1) conceptually illustrates the state of each pixel represented by region data when the region data of each pixel in the lower right block is moved by −2 in the X-direction and −2 in the Y-direction from the position shown in FIG. 4(b) similarly to FIG. 3(b1).

More specifically, FIG. 4(a1) conceptually illustrates the state of each pixel represented by the previous compensation region data FAD (FIG. 2) generated based on the region data in the previous frame and the motion vector data, and FIG. 4(b1) conceptually illustrates the state of each pixel represented by the present compensation region data RAD (FIG. 2) generated based on the region data in the present frame and the motion vector data.

Note that in the example in FIG. 4(a1), the region data indicates that the pixels at (x, y)=(4, 5), and (5, 5) represent the character. More specifically, the region data (previous compensation region data FAD) in this example indicates that in the previous compensation frame (FIG. 3(a1)), the character is represented by pixels at (x, y)=(4, 5), and (5, 5).

In the example in FIG. 4(b1), the pixels at (x, y)=(4, 3), (4, 4), (5, 3), (5, 4), and (5, 5) represent the character. More specifically, the region data (present compensation region data RAD) in this example indicates that in the present compensation frame (FIG. 3(b1)), the pixels at (x, y)=(4, 3), (4, 4), (5, 3), (5, 4), and (5, 5) represent the character.

As in the foregoing, the present frame region data PAD (FIG. 2) specifies the character display pixels in the present frame, the previous compensation region data FAD (FIG. 2) specifies the character display pixels in the previous compensation frame, and the present compensation region data RAD (FIG. 2) specifies the character display pixels in the present compensation frame.

Now, a method of selecting video data by the video data selector 91 will be described.

Figure 5:
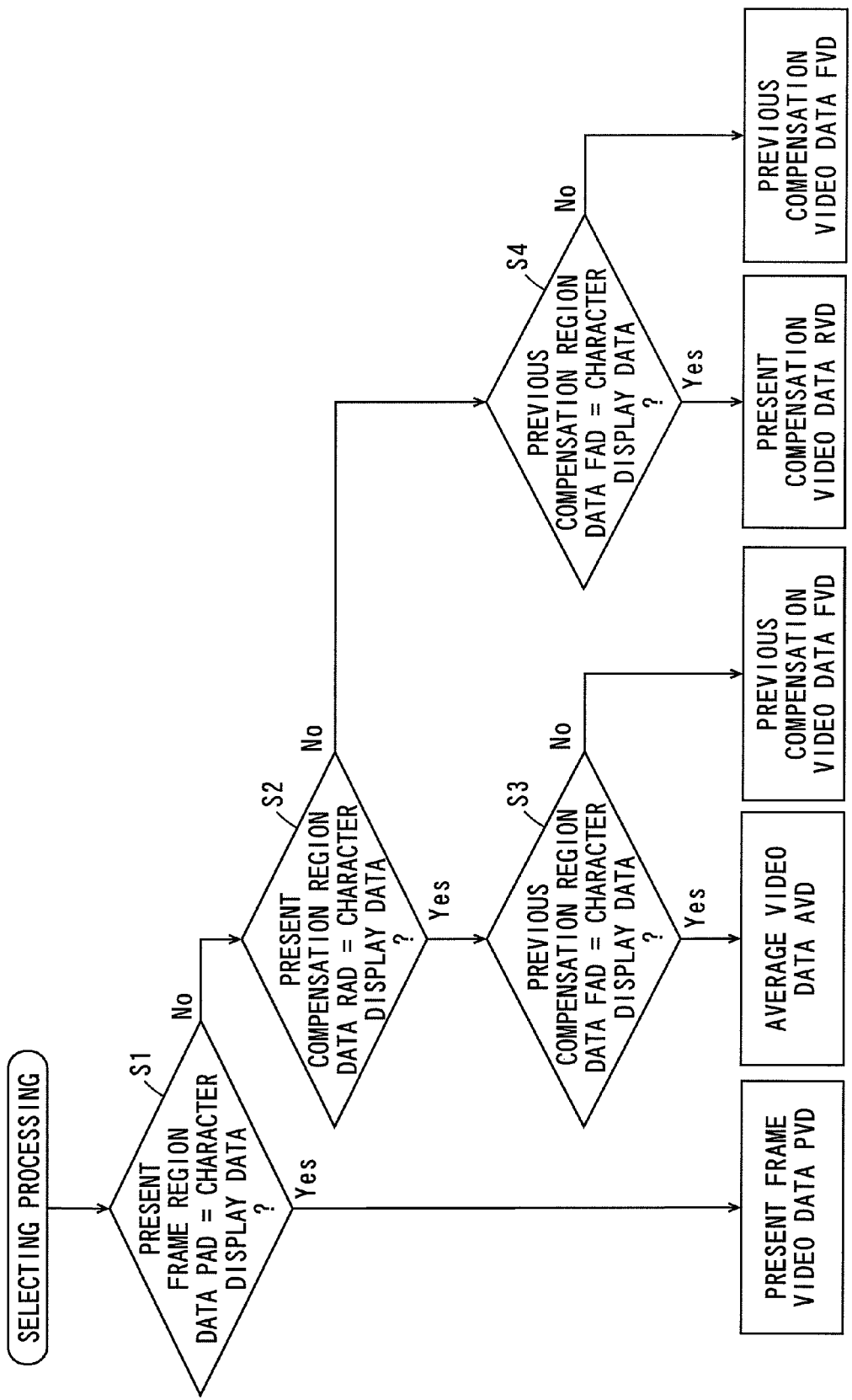
FIG. 5 is a flowchart for use in illustrating the process of selecting video data by a video data selector.

FIG. 5 is a flowchart for use in illustrating the process of selecting video data by the video data selector 91. Note that the selecting processing in the flowchart in FIG. 5 is carried out for each pixel.

As shown in FIG. 5, the video data selector 91 determines whether the present frame region data PAD is data that indicates character display (hereinafter referred to as "character display data") (step S1).

If it is determined that the present frame region data PAD is character display data, the video data selector 91 selects the present frame video data PVD (FIG. 2) and outputs the selected data to the video output unit 110 (FIG. 2).

In the examples in FIGS. 3 and 4, it is determined that the present frame region data PAD is character display data for pixels at (x, y)=(2, 3), (3, 3), (6, 5), (6, 6), (7, 5), (7, 6), and (7, 7).

For example, as for the pixel at (x, y)=(2, 3), the present frame region data PAD (see FIG. 4(b)) is character display data. In this case, in the present frame (FIG. 3(b)), part of the character C1 is displayed by the pixel at (x, y)=(2, 3). Therefore, in the interpolation frame (FIG. 3(c)), it may be considered preferable that part of the character C1 is also represented by the pixel positioned at (x, y)=(2, 3).

Therefore, according to the embodiment, the video data selector 91 selects the present frame video data PVD (FIG. 2)

and then outputs the selected data to the video output unit 110 (FIG. 2). More specifically, the video data for the pixel positioned at (x, y)=(2, 3) in the present frame (FIG. 3(*b*)) is used as the video data for the pixel positioned at (x, y)=(2, 3) in the interpolation frame (FIG. 3(*c*)). In this way, in the interpolation frame, part of the character C1 is represented by the pixel positioned at (x, y)=(2, 3).

If it is determined in step S1 that the present frame region data PAD is not character display data, the video data selector 91 determines whether the present compensation region data RAD is character display data (step S2).

If it is determined that the present compensation region data RAD is character display data, the video data selector 91 determines whether the previous compensation region data FAD is character display data (step S3).

If it is determined that the previous compensation region data FAD is character display data, the video data selector 91 selects average video data AVD (FIG. 2) and outputs the data to the video output unit 110 (FIG. 2).

Note that in the examples in FIGS. 3 and 4, it is determined that the previous compensation region data FAD is character display data for the pixel at (x, y)=(5, 5).

As for the pixel at (x, y)=(5, 5), the present frame region data PAD (see FIG. 4(*b*)) is not character display data. In this case, in the present frame (FIG. 3(*b*)), since the pixel at (x, y)=(5, 5) does not represent a character, it may be considered preferable that no character is displayed by the pixel at (x, y)=(5, 5) in the interpolation frame (FIG. 3(*c*)).

However, the previous compensation region data FAD (FIG. 4(*a*1)) and the present compensation region data RAD (FIG. 4(*b*1)) are character display data. More specifically, in the previous compensation frame and the present compensation frame, a character is displayed by the pixel at (x, y)=(5, 5). Note that in FIG. 3(*a*1), part of the character C1 is displayed, and in FIG. 3(*b*1), part of the character C2 is displayed. When the previous compensation video data FVD or the present compensation video data RVD is output to the video output unit 110, part of the character is displayed by the pixel at (x, y)=(5, 5) in the interpolation frame.

Therefore, according to the embodiment, the video data selector 91 selects the average video data AVD (FIG. 2) and outputs the selected data to the video output unit 110 (FIG. 2). More specifically, the luminance of the pixel at (x, y)=(5, 5) in the interpolation frame (FIG. 3(*c*)) is set to the average luminance of the pixel at (x, y)=(5, 5) in the previous frame (FIG. 3(*a*)) and the pixel at (x, y)=(5, 5) in the present frame (FIG. 3(*b*)).

In this way, in the interpolation frame, part of the character is prevented from being displayed by the pixel at (x, y)=(5, 5) and the picture quality is prevented from being degraded.

If it is determined in step S3 that the previous compensation region data FAD is not character display data, the video data selector 91 selects the previous compensation video data FVD (FIG. 2) and outputs the selected data to the video output unit 110 (FIG. 2).

Note that in the examples in FIGS. 3 and 4, it is determined that for the pixels at (x, y)=(4, 3), (4, 4), (5, 3), and (5, 4), the previous compensation region data FAD is not character display data.

For example, for the pixel at (x, y)=(5, 4), the present frame region data PAD (see FIG. 4(*b*)) is not character display data. In this case, in the present frame (FIG. 3(*b*)), no character is displayed by the pixel at (x, y)=(5, 4) and therefore it may be considered preferable that no character is displayed by the pixel at (x, y)=(5, 4) in the interpolation frame (FIG. 3(*c*)).

However, the present compensation region data RAD (see FIG. 4(*b*1)) is character display data. More specifically, in the present compensation frame, the character is represented by the pixel at (x, y)=(5.4). Note that in FIG. 3(*b*1), part of the character C2 is displayed. Therefore, when the present compensation video data RVD is output to the video output unit 110, part of the character is displayed by the pixel at (x, y)=(5, 4) in the interpolation frame.

Therefore, according to the embodiment, the video data selector 91 selects the previous compensation video data FVD (FIG. 2) and outputs the selected data to the video output unit 110 (FIG. 2). More specifically, the video data for the pixel at (x, y)=(5, 4) in the previous compensation frame (FIG. 3(*a*1)) is used as the video data for the pixel at (x, y)=(5, 4) in the interpolation frame (FIG. 3(*c*)).

Therefore, while part of the character can be prevented from being displayed by the pixel at (x, y)=(5, 4) in the interpolation frame, appropriate motion compensation can be carried out.

If it is determined in step S2 that the present compensation region data RAD is not character display data, the video data selector 91 determines whether the previous compensation region data FAD is character display data (step S4).

If it is determined that the previous compensation region data FAD is character display data, the video data selector 91 selects the present compensation region data RAD (FIG. 2) and outputs the selected data to the video output unit 110 (FIG. 2).

Note that in the examples in FIGS. 3 and 4, it is determined that the previous compensation region data FAD is character display data for the pixel at (x, y)=(4, 5).

For the pixel at (x, y)=(4, 5), the present frame region data PAD (see FIG. 4(*b*)) is not character display data. In this case, no character is displayed by the pixel at (x, y)=(4, 5) in the present frame (FIG. 3(*b*)), and therefore it may be considered preferable that no character is displayed by the pixel at (x, y)=(4, 5) in the interpolation frame (FIG. 3(*c*)).

However, the previous compensation region data FAD (FIG. 4(*a*1)) is character display data. More specifically, in the previous compensation frame, a character is displayed by the pixel at (x, y)=(4, 5). Note that part of the character C1 is displayed in FIG. 3(*a*1). Therefore, if the previous compensation video data FVD is output to the video output unit 110, part of the character is displayed by the pixel at (x, y)=(4, 5) in the interpolation frame.

Therefore, according to the embodiment, the video data selector 91 selects the present compensation video data RVD (FIG. 2) and outputs the selected data to the video output unit 110 (FIG. 2). More specifically, as the video data for the pixel at (x, y)=(4, 5) in the interpolation frame (FIG. 3(*c*)), the video data for the pixel at (x, y)=(4, 5) in the present compensation frame (FIG. 3(*b*1)) is used.

In this way, while part of the character can be prevented from being displayed by the pixel at (x, y)=(4, 5) in the interpolation frame, appropriate motion compensation can be carried out.

If it is determined in step S4 that the previous compensation region data FAD is not character display data, the video data selector 91 selects the previous compensation video data FVD (FIG. 2) and outputs the selected data to the video output unit 110 (FIG. 2).

Note that in the examples in FIGS. 3 and 4, it is determined that the previous compensation region data FAD is not character display data for pixels other than the pixels at (x, y)=(2, 3), (3, 3), (6, 5), (6, 6), (7, 5), (7, 6), (7, 7), (5, 5), (4, 3), (4, 4), (5, 3), (5, 4), and (4, 5).

For example, for the pixel at (x, y)=(3, 2), the present frame region data PAD (see FIG. 4(*b*)) is not character display data. In this example, in the present frame (FIG. 3(*b*)), no character is displayed by the pixel at (x, y)=(3, 2), and therefore it may be considered preferable that no character is displayed by the pixel at (x, y)=(3, 2) in the interpolation frame (FIG. 3(c)).

Here, for the pixel at (x, y)=(3, 2), neither the previous compensation region data FAD (see FIG. 4(a1)) nor the present compensation region data RAD (see FIG. 4(b1)) is character display data. More specifically, a character is not displayed by the pixel at (x, y)=(3, 2) in any of the previous compensation frame (FIG. 3(a1)) and the present compensation frame (FIG. 3(b1)).

Therefore, in the embodiment, the video data selector 91 selects the previous compensation video data FVD (FIG. 2) and outputs the selected data to the video output unit 110 (FIG. 2). More specifically, as the video data for the pixel at (x, y)=(3, 2) in the interpolation frame (FIG. 3(c)), the video data of the pixel at (x, y)=(3, 2) in the previous compensation frame (FIG. 3(a1)) is used. In this way, appropriate motion compensation can be carried out.

Note that in the flowchart in FIG. 5, if it is determined in step S4 that the previous compensation region data FAD is not character display data, the video data selector 91 selects the previous compensation video data FVD (FIG. 2) but the present compensation video data RVD may be selected instead.

More specifically, if it is determined in step S4 that the previous compensation region data FAD is not character display data, an interpolation frame may be generated by the video data in the previous frame and the motion vector similarly to normal motion compensation, or the interpolation frame may be generated based on the video data in the present frame and the motion vector.

(C) Effects of the Embodiment

As in the foregoing, according to the embodiment, before the frame rate conversion by the motion compensator 109, character data is superimposed on video data in the superimposer 106. More specifically, before the number of frames (frame frequency) increases, the character data is superimposed on the video data. In this way, the character data can be superimposed on the video data using a microcomputer 107 that operates at lower data processing speed than the case in which the video data after the frame rate conversion has character data superimposed thereon. Therefore, a high performance microcomputer 107 is not necessary, and therefore the product cost for the television receiver 100 can be reduced.

According to the embodiment, in the region in which a character is displayed in the present frame, the character is displayed in the interpolation frame, and a character is not displayed in the interpolation frame in the region in which a character is not displayed in the present frame. In the region in each of the present compensation frame and the previous compensation frame in which a character is displayed, the luminance of the region is set to the average luminance of the present frame and the previous frame. Furthermore, in a region in which a character is displayed only in the present compensation frame, video data in the previous compensation frame is used, and in a region in which a character is displayed only in the previous compensation frame, video data in the present compensation frame is used.

In this way, a character that should not be moved in the interpolation frame can be prevented from moving and the other video images can be prevented from being displayed in a region for displaying a character. More specifically, in the interpolation frame, a character can be displayed in an appropriate position.

Consequently, highly precise motion compensation can be carried out in an inexpensive manner.

(D) Other Examples

In the above-described example, the video data editor 92 and the vector reference data editor 93 are each provided with two frame memories, while two frame memories common to the video data editor 92 and the vector reference data editor 93 may be provided in the motion compensator 109.

Figure 6:
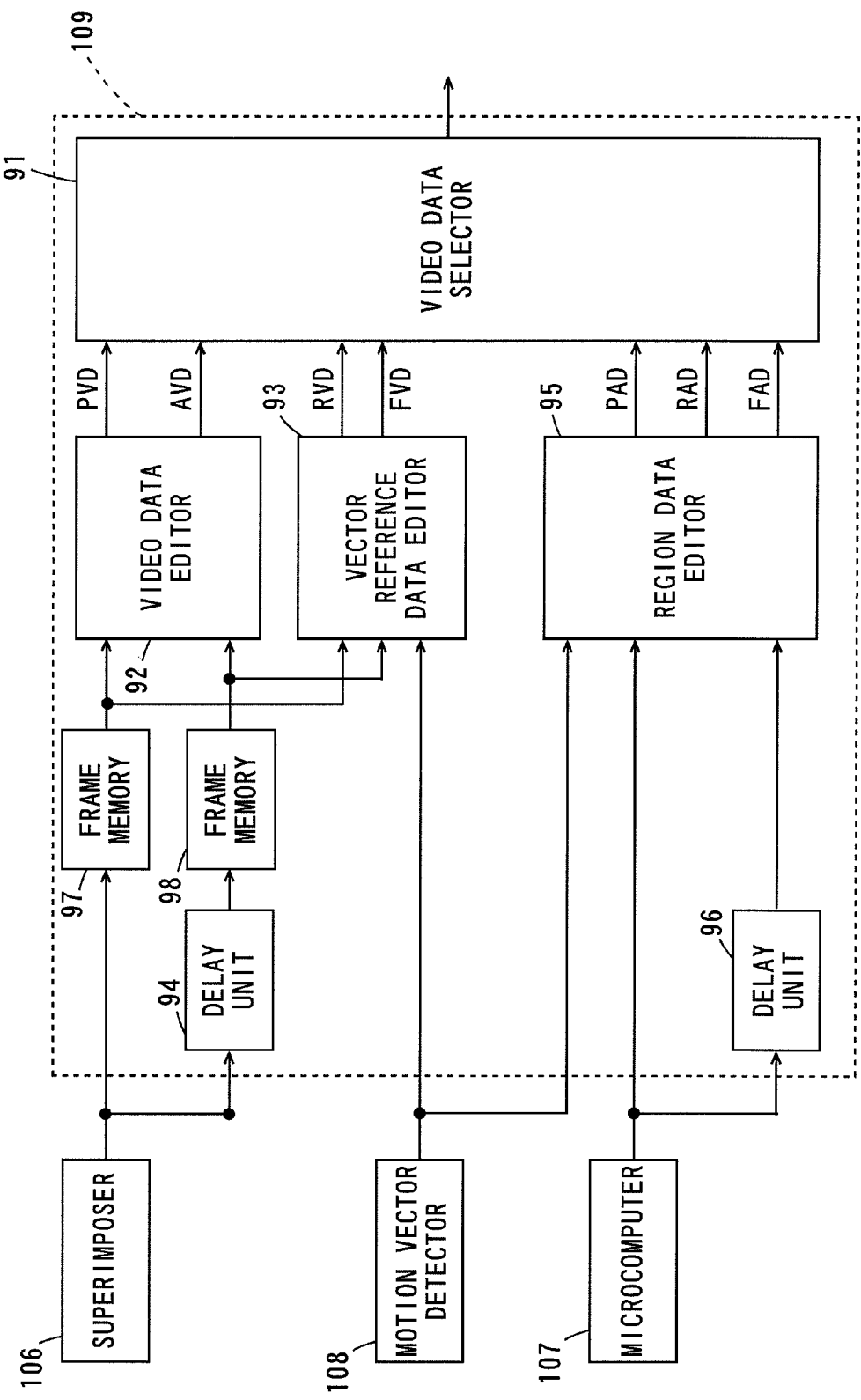
FIG. 6 is a block diagram of another example of the motion compensator.

FIG. 6 is a block diagram of another example of the motion compensator 109. The motion compensator 109 shown in FIG. 6 is provided with two frame memories 97 and 98, instead of the two frame memories provided in each of the video data editor 92 and the vector reference data editor 93.

In the motion compensator 109 in FIG. 6, video data output from the superimposer 106 is input to the frame memory 97 and the delay unit 94. The delay unit 94 delays the input video data by one frame and outputs the data to the frame memory 98. More specifically, the video data in the present frame is stored in the frame memory 97 and video data in the previous frame is stored in the frame memory 98.

The video data editor 92 directly outputs the video data in the present frame stored in the frame memory 97 as present frame video data PVD to the video data selector 91, generates average video data AVD from the video data in the present frame stored in the frame memory 97 and the video data in the previous frame stored in the frame memory 98 and outputs the generated data to the video data selector 91.

The vector reference data editor 93 generates present compensation video data RVD and previous compensation video data FVD based on the video data in the present frame stored in the frame memory 97 and motion vector data output from the motion vector detector 108 and outputs the generated data to the video data selector 91.

As in the foregoing, in the motion compensator 109 in FIG. 6, the two memories 97 and 98 are provided in common to the video data editor 92 and the vector reference data editor 93, so that the video data editor 92 and the vector reference data editor 93 each do not have to include frame memories. Therefore, the product cost for the television receiver 100 can be reduced.

A line memory may be used instead of the frame memories provided for each of the video data editor 92, the vector reference data editor 93, and the region data editor 95 shown in FIG. 2 and the frame memories 97 and 98 in FIG. 6. In this way, the product cost for the television receiver 100 can further be reduced.

In the above-described example, a character is not displayed in the interpolation frame in the region in which no character is displayed in the present frame, but a character may be displayed in a region in which no character is displayed in the present frame but a character is displayed in the previous frame.

In the above-described example, if a character is displayed by any pixel in the present frame, present frame video data PVD (FIG. 2) is used as the video data of a pixel in the interpolation frame corresponding to the pixel, while the present frame video data PVD may be used as the video data of any other pixel in the interpolation frame. More specifically, if a character is displayed in the present frame, the present frame video data PVD may be used as the video data for all the pixels in the interpolation frame.

In this case, if a character is displayed in the present frame, an interpolation frame based on a motion vector is not generated. In this way, in the interpolation frame, a character that should not be moved can surely be prevented from moving based on a motion vector. Consequently, in the interpolation frame, a character can be displayed in an appropriate position.

Note that in this case, the motion compensator 109 directly outputs the video data in the present frame output from the superimposer 106 as video data in the interpolation frame to the video output unit 110 if the character data is output from the microcomputer 107.

If a character is displayed in the present frame, average video data AVD (FIG. 2) or the video data in the previous frame may be used as the video data for all the pixels in the interpolation frame.

In this case, if a character is displayed in the present frame similarly to the above-described case, an interpolation frame is not generated based on a motion vector. Therefore, a character that should not be moved in the interpolation frame can surely be prevented from moving based on the motion vector. Consequently, a character can be displayed in an appropriate position in the interpolation frame.

In this case, the motion compensator 109 directly outputs the average video data AVD or the video data in the previous frame as the video data in the interpolation frame to the video output unit 110 when character data is output from the microcomputer 107.

Part of the character may be displayed in a transmitted state. In this case, region data indicating a region in which a character in a non-transmitted state is displayed and region data indicating a region in which a character in a transmitted state is displayed are generated in the microcomputer 107. When the region data indicates character display in a transmitted state, data produced by adding the value of the character data and the value of the video data in a predetermined ratio is generated at the superimposer 106 or the motion compensator 109.

(2) Second Embodiment

A television receiver according to a second embodiment is different from the television receiver 100 according to the first embodiment in the following point.

Figure 7:
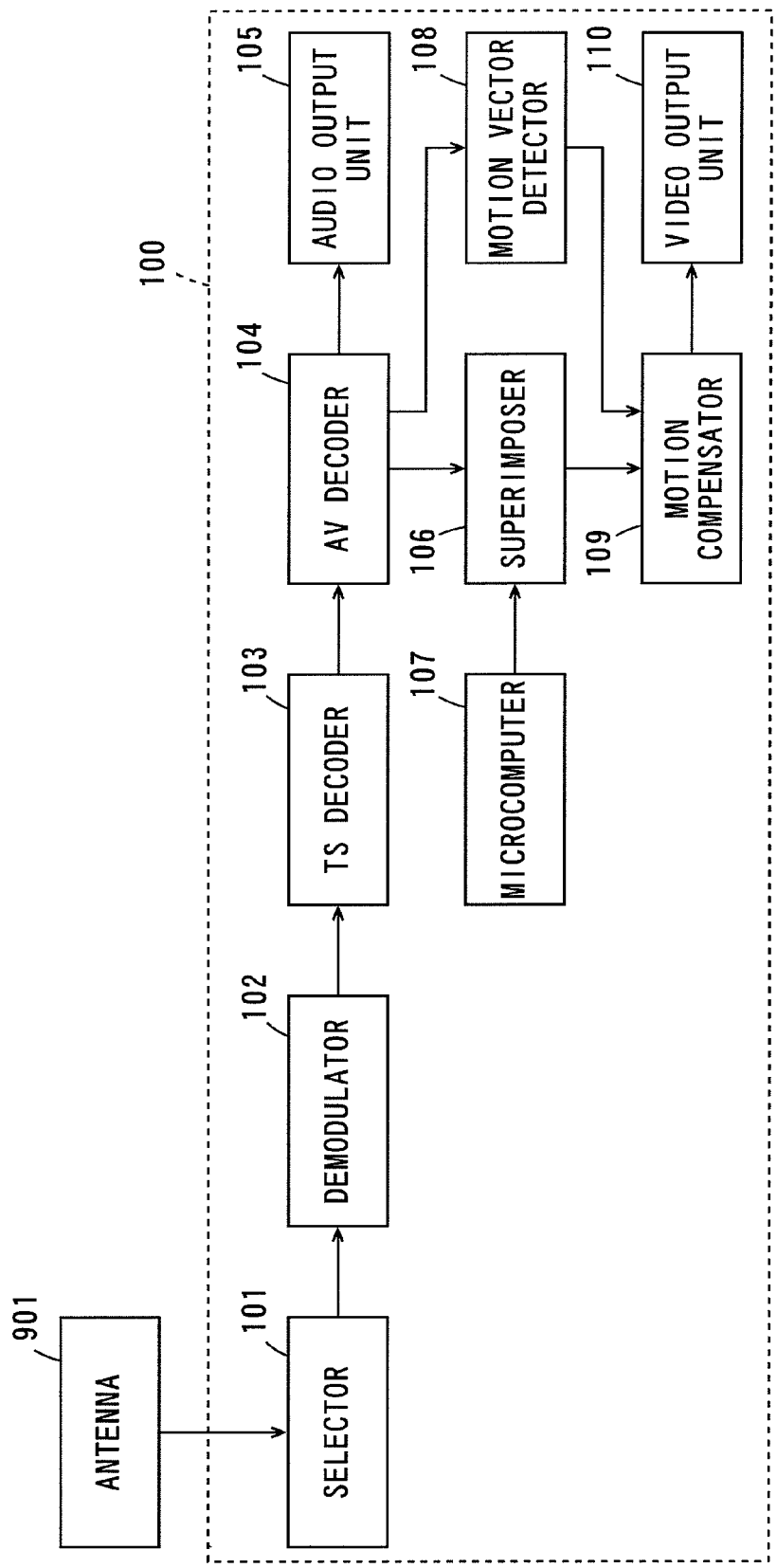
FIG. 7 is a block diagram of the structure of a television receiver according to a second embodiment.

FIG. 7 is a block diagram of the structure of the television receiver 100 according to the second embodiment.

As shown in FIG. 7, in the television receiver 100 according to the embodiment, the AV decoder 104 outputs audio data to the audio output unit 105 and video data to the superimposer 106 and the motion vector detector 108.

The microcomputer 107 generates character data and outputs the generated character data to the superimposer 106.

If the microcomputer 107 outputs character data, the superimposer 106 superimposes the character data on the video data output from the AV decoder 104 and outputs the video data having the character data superimposed thereon to the motion compensator 109.

If the microcomputer 107 does not output character data, the superimposer 106 directly outputs the video data output from the AV decoder 104 to the motion compensator 109.

The motion vector detector 108 detects a motion vector each for a prescribed block (such as a pixel region of 8×8 pixels) based on the video data output from the AV decoder 104 and outputs the motion vector data of each pixel to the motion compensator 109. A method of detecting a motion vector will be described later.

The motion compensator 109 carries out frame rate conversion to the video data output from the superimposer 106 based on the motion vector data output from the motion vector data detector 108.

As in the foregoing, in the embodiment, the video data output from the AV decoder 104 is input to the superimposer 106 and the motion vector detector 108. Therefore, the motion vector detector 108 can detect a motion vector based on video data on which no character data is superimposed.

Now, a method of detecting a motion vector will be described as video data with character data superimposed thereon in the superimposer 106 (hereinafter referred to as "superimposed video data") and video data with no character data superimposed thereon (hereinafter referred to as "simple video data") are compared.

Figure 8:
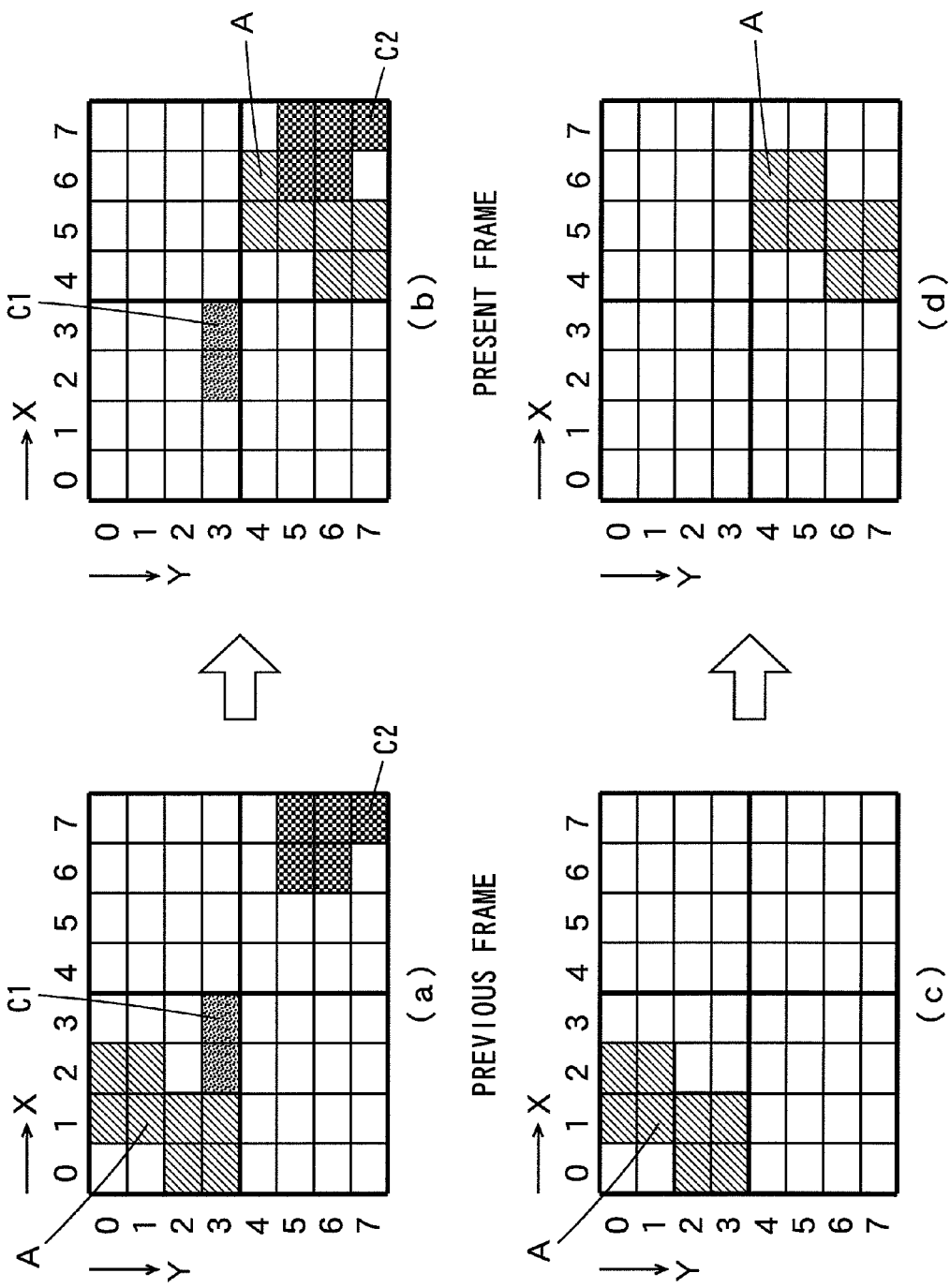
FIG. 8 is a view for use in illustrating a method of detecting a motion vector by a motion vector detector in FIG. 7.

FIG. 8 is a view for use in illustrating a method of detecting a motion vector by the motion vector detector 108 in FIG. 7.

In FIG. 8, (a) shows a region (a pixel region of 8×8 pixels) of the previous frame generated based on superimposed video data, (b) shows a region of the present frame generated based on the superimposed video data, (c) shows a region of a frame generated based on simple video data in the frame shown in (a), i.e., on simple video data in the previous frame, and (d) shows a region of a frame generated based on simple video data in the frame shown in (b), i.e., on simple video data in the present frame.

Note that in the example, the motion vector detector 108 detects a motion vector each for 4×4 pixels as one block for the ease of description. FIG. 8(a) is equal to FIG. 3(a) and FIG. 8(b) is equal to FIG. 3(b).

Here, as described above, in the embodiment, the simple video data is input to the motion vector detector 108 (FIG. 7). Therefore, when frames as shown in FIG. 8(a) and 8(b) are displayed on the screen of the television receiver 100, the motion vector detector 108 detects a motion vector based on the simple video data (data in the frames in FIG. 8(c) and (d)).

In the example in FIG. 8, the motion vector detector 108 (FIG. 7) can detect a motion vector (+4 in the X-direction and +4 in the Y-direction) that indicates the movement of the video data of each pixel in the upper left block to the lower right block based on the movement of the moving object A shown in FIGS. 8(c) and (d).

As described above, according to the embodiment, before the frame rate conversion by the motion compensator 109, character data is superimposed on video data in the superimposer 106. More specifically, before the number of frames increases, the character data is superimposed on the video data. In this way, the character data can be superimposed on the video data using a microcomputer 107 whose data processing speed is lower than the case in which the character data is superimposed on the video data after the frame rate conversion. Therefore, a high performance microcomputer 107 is not necessary, so that the product cost for the television receiver 100 can be reduced.

The motion vector detector 108 detects a motion vector based on video data on which character data is not superimposed. More specifically, a motion vector can be detected with no consideration given to a character. Therefore, as for a video part in a region originally occluded by a character (positioned at (x, y)=(6, 5) in the frame shown in (b) in FIG. 8), precise matching can be carried out between the previous frame and the present frame. As a result, a motion vector can be detected highly precisely between the previous frame and the present frame.

Therefore, when video data having character data superimposed thereon is subjected to frame rate conversion, precise matching can be carried out between the previous frame and the present frame.

Consequently, highly precise motion compensation can be carried out in an inexpensive manner.

According to the embodiment, when for example a character is displayed by all the pixels in the lower right block in the present frame (FIG. 8(b)), precise matching can be achieved between the previous frame (FIG. 8(a)) and the present frame (FIG. 8(b)) for the moving object A (FIG. 8).

(2-1) Another Example of Second Embodiment

Figure 9:
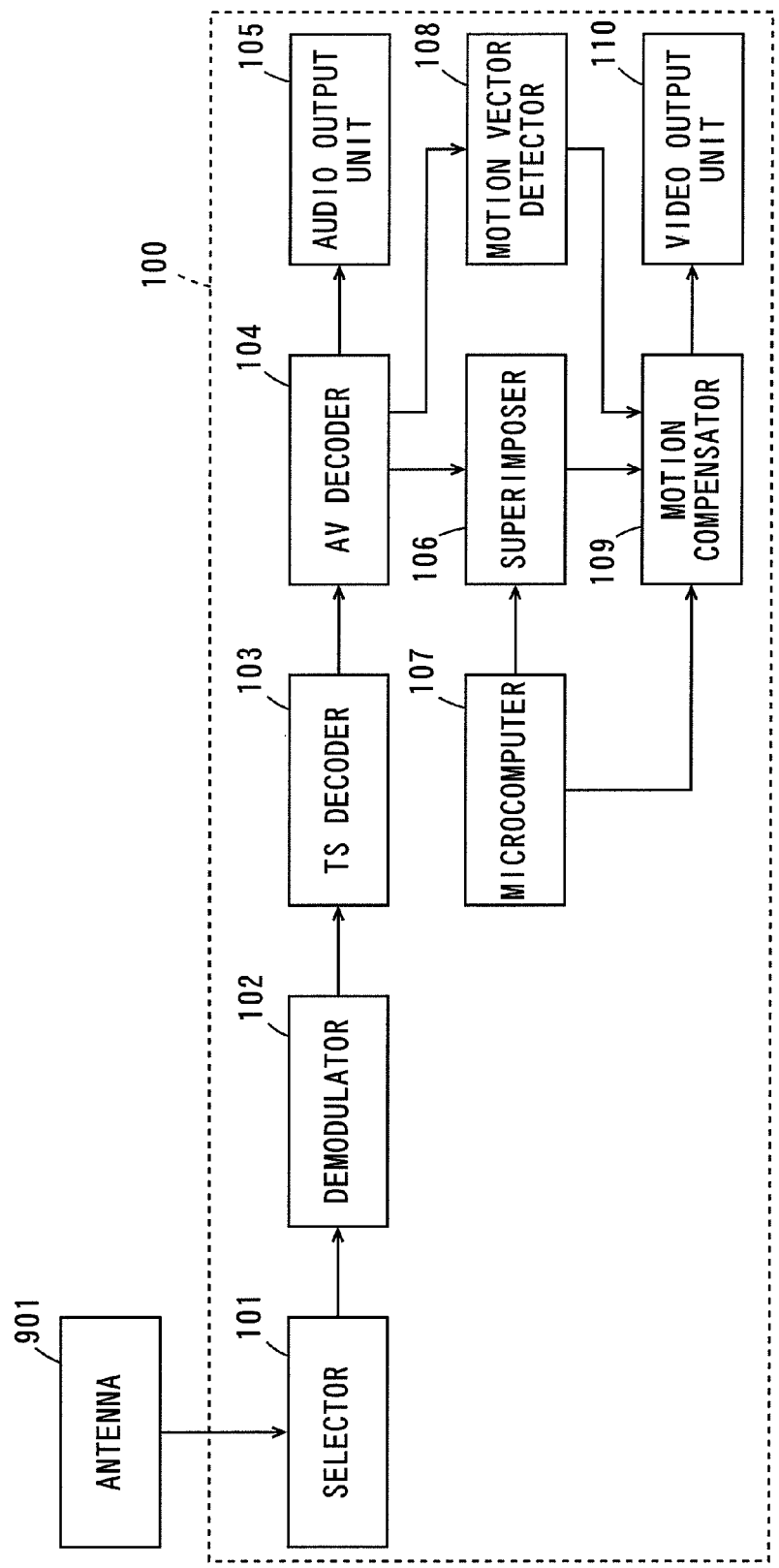
FIG. 9 is a block diagram of the structure of an example of the television receiver according to the second embodiment and the structure of a television receiver according to a third embodiment.

FIG. 9 is a block diagram of the structure of a television receiver according to another example of the second embodiment.

In the television receiver 100 in FIG. 9, the microcomputer 107 generates region data and outputs the generated region data to the motion compensator 109 similarly to the television receiver 100 in FIG. 1.

The motion compensator 109 carries out frame rate conversion to the video data output from the superimposer 106 based on the motion vector data output from the motion vector detector 108 and the region data output from the microcomputer 107.

In this case, the motion compensator 109 can generate data in the interpolation frame for the region in which a character is displayed in the present frame or the previous frame based on the region data without using motion vector data. In this way, the video image around the character display region can be prevented from being blurry. Consequently, more precise motion compensation can be achieved.

(3) Third Embodiment

A television receiver according to a third embodiment is different from the television receiver 100 (FIGS. 1 and 7) according to the first embodiment in the following point. The structure of the television receiver according to the third embodiment is the same as that of the television receiver 100 shown in FIG. 9.

As shown in FIG. 9, in the television receiver 100 according to the third embodiment, the AV decoder 104 outputs audio data to the audio output unit 105 and outputs video data to the superimposer 106 and the motion vector detector 108.

When the microcomputer 107 outputs character data, the superimposer 106 superimposes the character data on the video data output from the AV decoder 104. The video data having the character data superimposed thereon is then output to the motion compensator 109.

When the microcomputer 107 does not output character data, the superimposer 106 directly outputs the video data output from the AV decoder 104 to the motion compensator 109.

The motion vector detector 108 detects a motion vector for each of a prescribed block (such as a pixel region of 8×8 pixels) based on the video data output from the AV decoder 104 and outputs the motion vector data of each pixel to the motion compensator 109. Note that a method of detecting a motion vector by the motion vector detector 108 is the same as the method described in connection with the second embodiment (see FIG. 8).

The motion compensator 109 carries out frame rate conversion to the video data output from the superimposer 106 based on the motion vector data output from the motion vector detector 108 and the region data output from the microcomputer 107. Note that in the frame rate conversion, the motion compensator 109 carries out the same processing as that described in conjunction with FIGS. 2 to 5.

As in the foregoing, the television receiver 100 according to the embodiment has a combined structure of the television receivers 100 according to the first and second embodiments.

More specifically, before the frame rate conversion by the motion compensator 109, character data is superimposed on video data in the superimposer 106. In other words, before the number of frames increases, the character data is superimposed on the video data. In this way, the character data can be superimposed on the video data using a microcomputer 107 whose data processing speed is lower than that in the case in which the character data is superimposed on the video data after the frame rate conversion. Therefore, a high performance microcomputer 107 is not necessary, so that the product cost for the television receiver 100 can be reduced.

In a region in which a character is displayed in the present frame, the character is displayed in the interpolation frame, and in a region in which no character is displayed in the present frame, no character is displayed in the interpolation frame. In a region in which a character is displayed both in the present compensation frame and in the previous compensation frame, the luminance of the region is set to the average luminance of the present frame and the previous frame. Furthermore, in a region in which a character is displayed only in the present compensation frame, video data in the previous compensation frame is used, and in a region in which a character is displayed only in the previous compensation frame, video data in the present compensation frame is used.

In this way, a character that should not be moved in the interpolation frame can be prevented from moving and any other video image can be prevented from being displayed in a region in which a character should be displayed. More specifically, a character can be displayed in an appropriate position in the interpolation frame.

The motion vector detector 108 detects a motion vector based on video data on which character data is not superimposed. More specifically, a motion vector can be detected with no consideration given to a character. In this way, for a video part present in a region originally occluded by a character, precise matching can be carried out between the previous frame and the present frame. Consequently, a motion vector can be detected highly precisely between the previous frame and the present frame.

Therefore, when video data having character data superimposed thereon is subjected to frame rate conversion, precise matching can be carried out between the previous frame and the present frame.

Consequently, highly precise motion compensation can be carried out in an inexpensive manner.

(4) Fourth Embodiment

A television receiver according to a fourth embodiment is different from the television receiver 100 according to the first embodiment in the following point.

Figure 10:
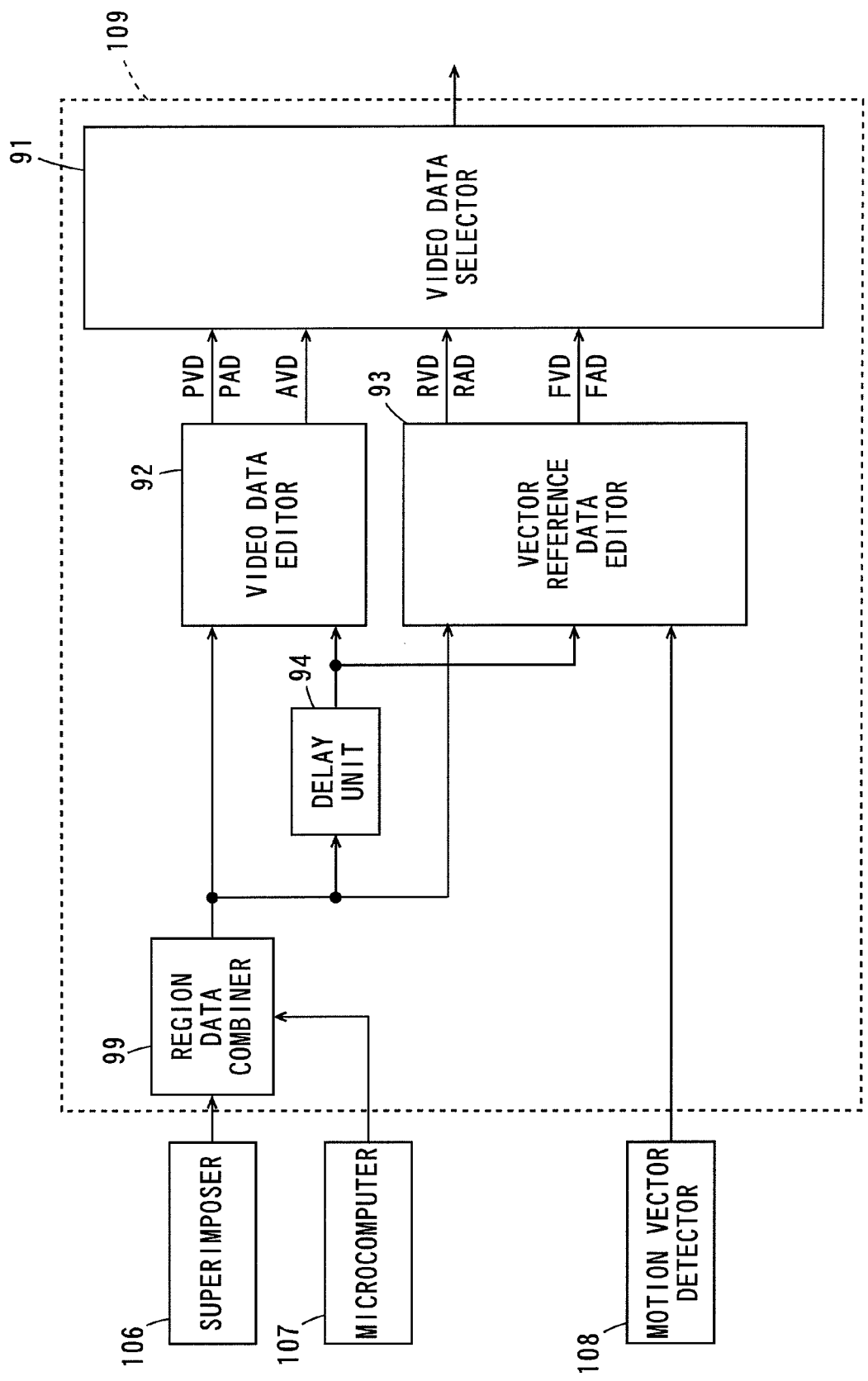
FIG. 10 is a block diagram of the structure of a main part of a motion compensator in a television receiver according to a fourth embodiment.

FIG. 10 is a block diagram of a main part of the motion compensator 109 in the television receiver according to the fourth embodiment.

As shown in FIG. 10, according to the embodiment, the motion compensator 109 includes a video data selector 91, a video data editor 92, a vector reference data editor 93, a delay unit 94, and a region data superimposer 99.

According to the embodiment, video data output from the superimposer 106 and region data output from the microcomputer 107 are input to the region data superimposer 99.

Motion vector data output from the motion vector detector 108 is input to the vector reference data editor 93.

The region data superimposer 99 superimposes the region data output from the microcomputer 107 on the video data output from the superimposer 106. The region data superimposer 99 outputs the video data having the region data superimposed thereon to one frame memory of the video data editor 92, one frame memory of the vector reference data editor 93, and the delay unit 94.

The delay unit 94 delays the input video data by one frame and outputs the delayed data to the other frame memory of the video data editor 92 and the other frame memory of the vector reference data editor 93.

Here, in the embodiment, the video data has the region data superimposed thereon in the region data superimposer 99 as described above. Therefore, the present frame video data PVD (see FIG. 2) as well as the present frame region data PAD (see FIG. 2) is output from the video data editor 92.

In the vector reference data editor 93, motion compensation is carried out to the video data having the region data superimposed thereon. Therefore, the vector reference data editor 93 outputs the present compensation video data RVD (see FIG. 2) as well as the present compensation region data RAD (see FIG. 2) and the previous compensation video data FVD (see FIG. 2) as well as the previous compensation region data FAD (see FIG. 2).

The video data selector 91 selects one of the four video data pieces PVD, AVD, RVD, and FVD according to the same method as the method described in connection with FIG. 5 based on the three region data pieces PAD, RAD, and FAD and outputs the selected video data to the video output unit 110 (see FIG. 2).

As in the foregoing, according to the embodiment, region data is superimposed on video data in the region data superimposer 99. In this way, the present compensation region data RAD and the previous compensation region data FAD can be generated in the vector reference data editor 93. Therefore, the region data editor 95 and the delay unit 96 are not necessary. In this way, the structure of the television receiver can be simplified and the product cost can be reduced.

(5) Fifth Embodiment

Figure 15:
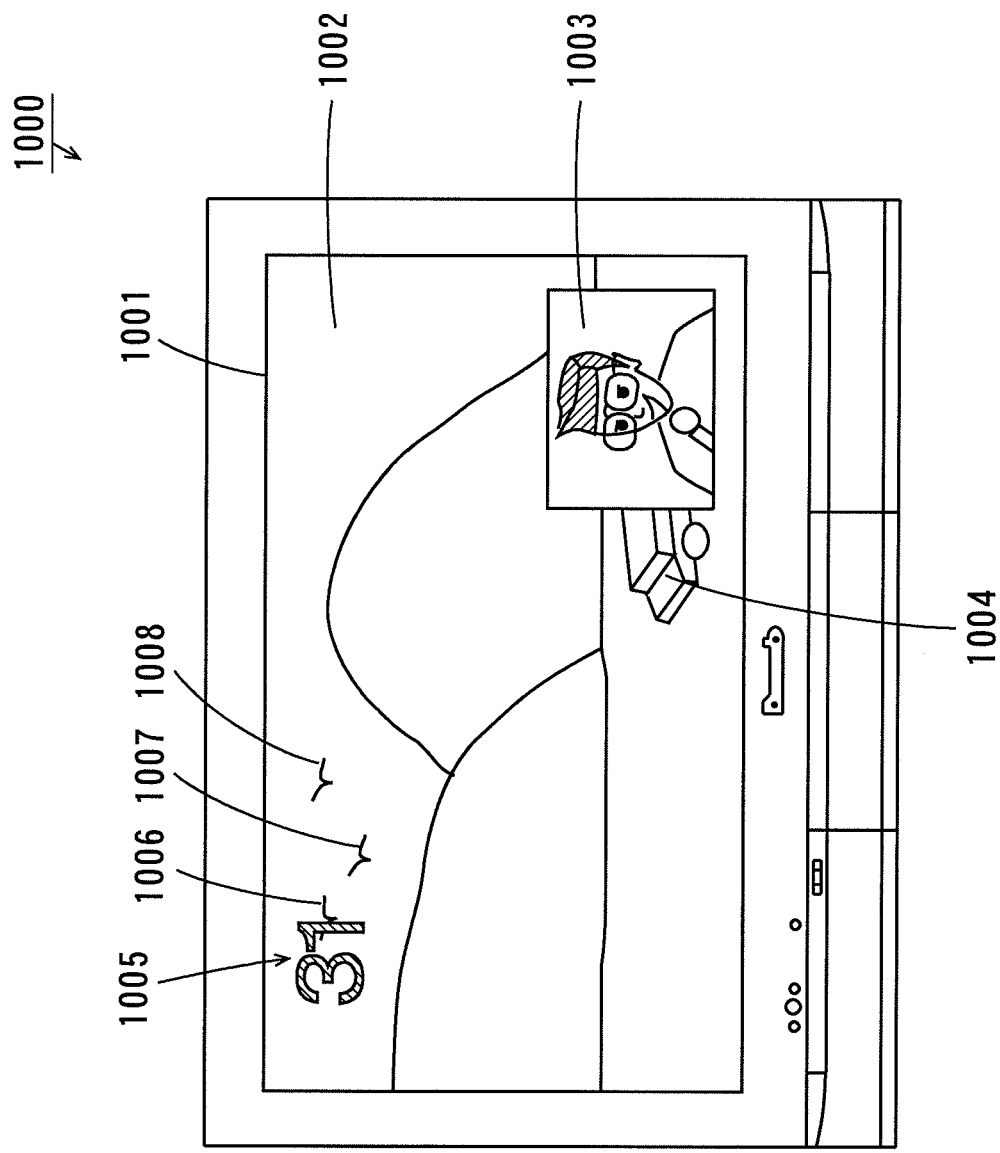
FIG. 15 is a view of one example of how two screen images are displayed at the same time on the display panel of a television receiver.
Figure 16:
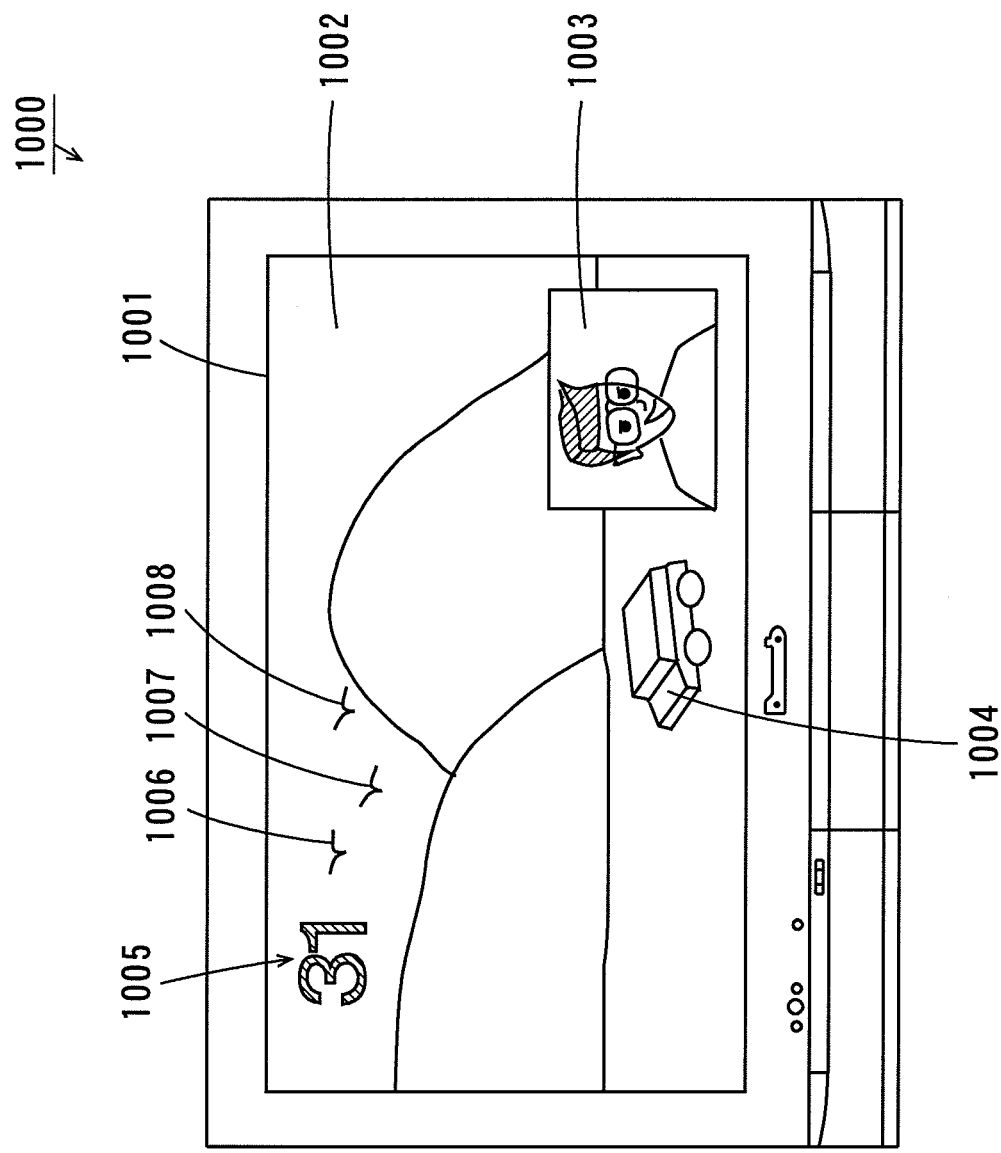
FIG. 16 is a view of one example of how two screen images are displayed at the same time on the display panel of a television receiver.

A television receiver according to a fifth embodiment is different from the television receiver 100 (FIG. 9) according to the third embodiment in the following point. In the following description of the fifth embodiment, frame rate conversion is carried out while two screen images are displayed on the display panel (for example as shown in FIGS. 15 and 16, a main screen image 1002 and a sub screen image 1003 are displayed). Now, the television receiver 100 according to the embodiment will be described with reference to FIGS. 15 and 16.

Figure 11:
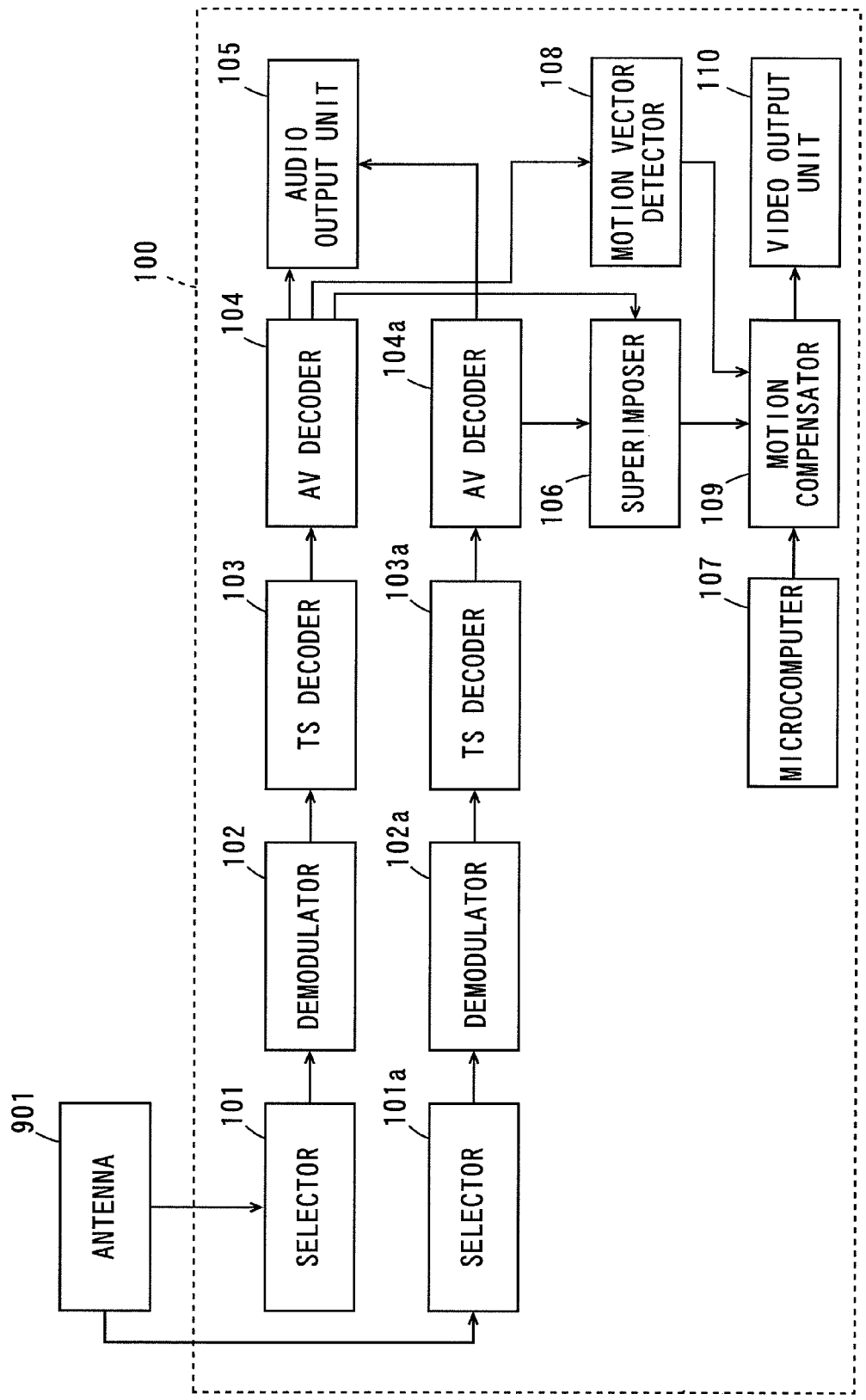
FIG. 11 is a block diagram of the structure of a television receiver according to a fifth embodiment.

FIG. 11 is a block diagram of the structure of the television receiver 100 according to the fifth embodiment.

As shown in FIG. 11, the television receiver 100 according to the embodiment includes a selector 101a, a demodulator 102a, a TS decoder 103a, and an AV decoder 104a that have the same structures as those of the selector 101, the demodulator 102, the TS decoder 103, and the AV decoder 104 shown in FIG. 9.

A broadcasting signal input from an antenna 901 to the selector 101a is input to the AV decoder 104a as an audio stream and a video stream through the demodulator 102a and the TS decoder 103a.

The AV decoder 104a decodes the input audio stream and video stream and generates audio data and video data. The AV decoder 104a outputs the generated audio data to the audio output unit 105 and the video data to the superimposer 106.

The audio output unit 105 selects one of the audio data output from the AV decoder 104 and the audio data output from AV decoder 104a and outputs the selected data as audio sound.

The superimposer 106 superimposes the video data output from AV decoder 104a on the video data output from the AV decoder 104 and outputs the superimposed video data to the motion compensator 109.

Note that when the video data superimposed in the superimposer 106 is displayed on the display panel, a video image based on the video data output from the AV decoder 104 is displayed on the entire surface of the display panel 1001 as a main screen image 1002, and a video image based on the video data output from the AV decoder 104a is displayed in one region of the main screen image 1002 as the sub screen image 1003 as shown in FIGS. 15 and 16.

The microcomputer 107 generates region data and outputs the generated region data to the motion compensator 109. Note that the region data generated in the microcomputer 107 is information representing a region in which the sub screen image 1003 is displayed and indicates for each pixel whether the pixel is part of the region in which the sub screen image 1003 is displayed.

The motion compensator 109 carries out frame rate conversion to the video data output from the superimposer 106 based on the motion vector data output from the motion vector detector 108 and the region data output from the microcomputer 107. Note that in the frame rate conversion, the motion compensator 109 carries out the same processing as that described in conjunction with FIGS. 2 to 5.

As described above, according to the embodiment, the motion vector detector 108 detects a motion vector based on video data output from the AV decoder 104. Then, in the main screen image 1002, precise matching can be carried out between the previous frame and the present frame for a video part present in a region occluded by the sub screen image 1003. Consequently, the motion vector can be detected highly precisely between the previous frame and the present frame in the main screen image 1002.

According to the embodiment, for the region in which the sub screen image 1003 is displayed in the present frame of the main screen image 1002, the sub screen image is displayed also in the interpolation frame. The luminance of pixels when the subscreen image 1003 is displayed both in the present compensation frame and the previous compensation frame of the main screen image 1002 is set to the average luminance of the present frame and the previous frame of the main screen image 1002. Furthermore, for the pixels for the sub screen image 1003 displayed only in the present compensation frame of the main screen image 1002, video data in the previous compensation frame is used and for the pixels for the sub screen image 1003 displayed only in the previous compensation frame, video data in the present compensation frame is used.

In this way, the sub screen image 1003 that should not move on the main screen image 1002 can be prevented from moving, and the video image of the main screen image 1002 can be prevented from being displayed in the region in which the sub screen image 1003 should be displayed. Therefore, the sub screen image 1003 can be displayed in an appropriate position in the interpolation frame.

As a result, highly precise motion compensation can be achieved, so that high picture quality video images can stably be provided.

Note that in the example described above, the motion vector detector 108 detects the motion vector for the video data output from the AV decoder 104, while an additional motion vector detector may be provided, and a motion vector may be detected for video data output from the AV decoder 104a. In this case, motion compensation can be carried out for a video image displayed as the sub screen image 1003, and therefore video images with even higher picture quality can be provided.

(6) Sixth Embodiment

A television receiver according to a sixth embodiment is different from the television receiver 100 (FIG. 11) according to the fifth embodiment in the following point.

Figure 12:
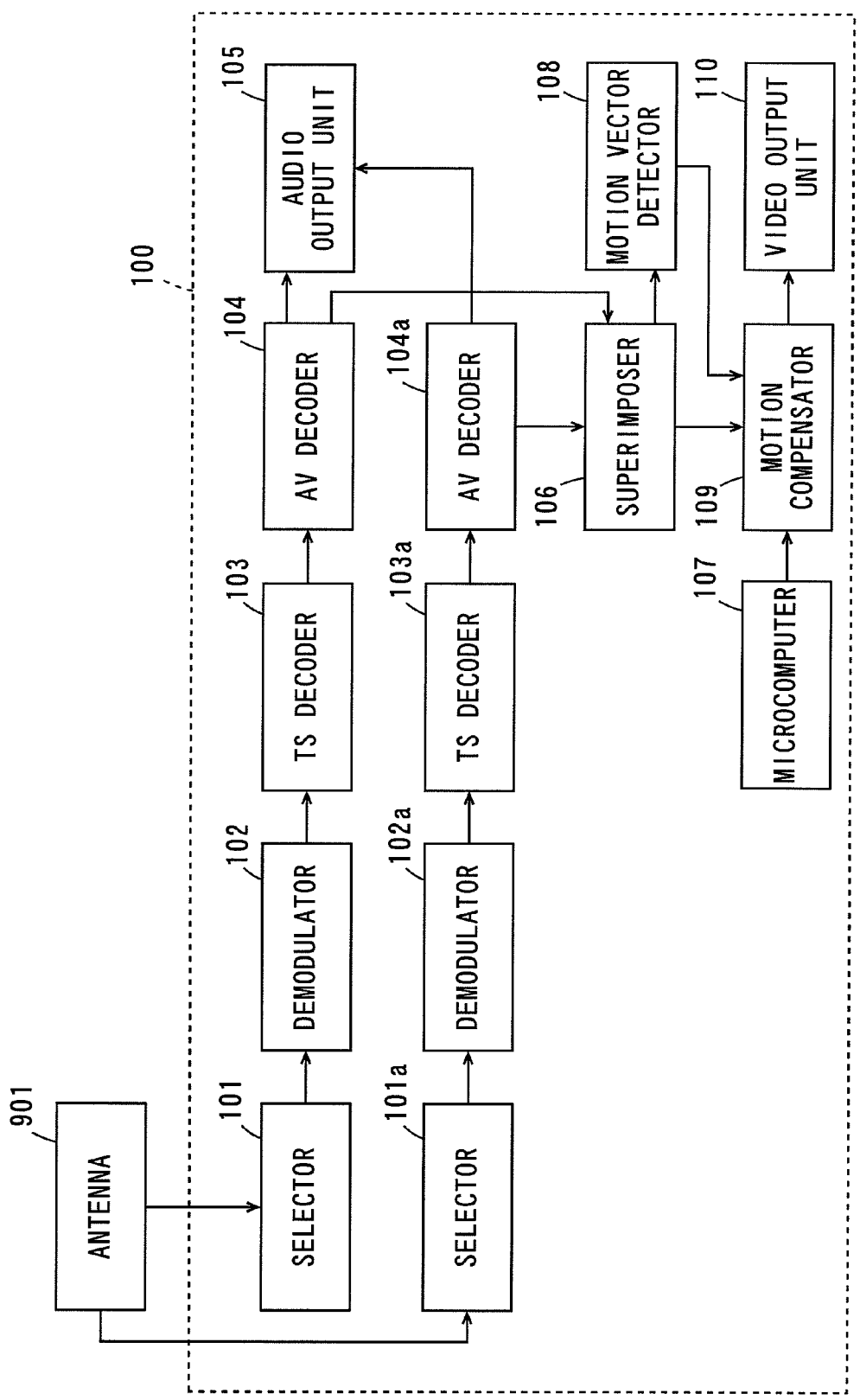
FIG. 12 is a block diagram of the structure of a television receiver according to a sixth embodiment.

FIG. 12 is a block diagram of the structure of the television receiver 100 according to the sixth embodiment.

As shown in FIG. 12, in the television receiver 100 according to the embodiment, the motion vector detector 108 detects a motion vector based on video data output from the superimposer 106.

The motion compensator 109 carries out frame rate conversion to the video data output from the superimposer 106 based on the motion vector data output from the motion vector detector 108 and the region data output from the microcomputer 107. Note that in the frame rate conversion, the motion compensator 109 carries out the same processing as that described in conjunction with FIGS. 2 to 5.

In this case, in a region in which the sub screen image 1003 (see FIG. 15) is displayed in the present frame, the sub screen image 1003 is displayed in the interpolation frame, and in a region in which the sub screen image 1003 is not displayed in the present frame, the sub screen image 1003 is not displayed in the interpolation frame. In a region in which the sub screen image 1003 is displayed both in the present compensation frame and the previous compensation frame, the luminance of the region is set to the average luminance of the present frame and the previous frame. In addition, in a region in which the sub screen image 1003 is displayed only in the present compensation frame, video data in the previous compensation frame is used, and in a region in which the sub screen image 1003 is displayed only in the previous compensation frame, video data in the present compensation frame is used.

Therefore, the sub screen image 1003 that should not move in the interpolation frame can be prevented from moving, and any other video image can be prevented from being displayed in a region in which the sub screen image 1003 should be displayed. More specifically, in the interpolation frame, the sub screen image 1003 can be displayed in an appropriate position.

Consequently, highly precise motion compensation can be carried out in an inexpensive manner.

Note that the region data may represent a region including the contour line of the sub screen image 1003 (such as the outer frame part of the sub screen image 1003). In this case, except for the region of the sub screen image 1003 described above, normal motion compensation is carried out similarly to the case of the video image in the main screen image 1002. Therefore, the boundary part between the main screen image 1002 and the sub screen image 1003 that should not move can be prevented from moving, while highly precise motion compensation can be achieved.

(7) Seventh Embodiment

A television receiver according to a seventh embodiment is different from the television receiver 100 (FIG. 9) according to the third embodiment in the following point.

Figure 13:
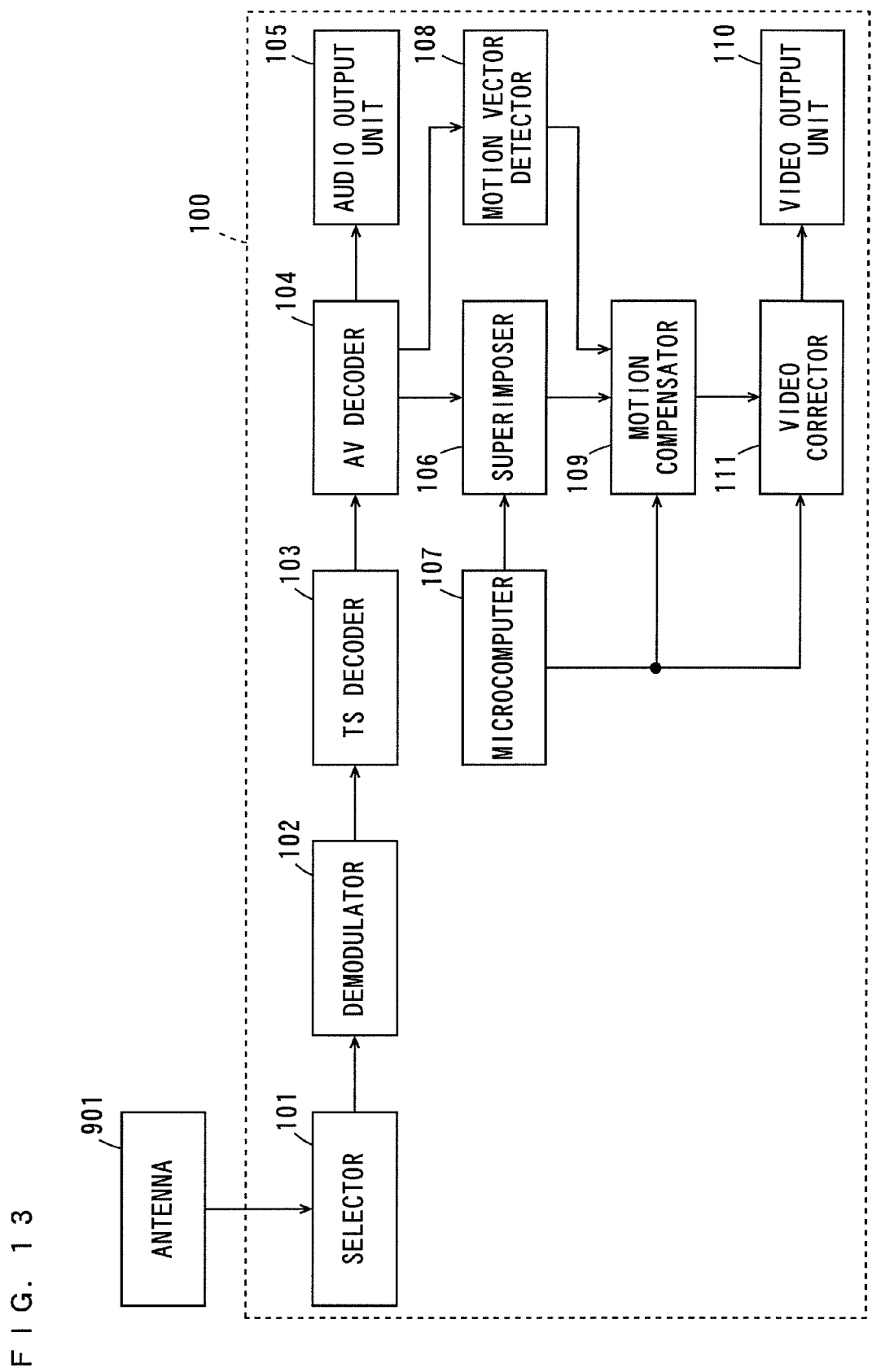
FIG. 13 is a block diagram of the structure of a television receiver according to a seventh embodiment.

FIG. 13 is a block diagram of the structure of the television receiver 100 according to the seventh embodiment.

As shown in FIG. 13, the television receiver 100 according to the embodiment further includes a video corrector 111. According to the embodiment, the microcomputer 107 outputs region data to the motion compensator 109 and the video corrector 111. The motion compensator 109 outputs video data after frame rate conversion to the video corrector 111.

The video corrector 111 carries out video correction to the video data output from the motion compensator 109 and outputs the video data after the video correction to the video output unit 110.

More specifically, the video corrector 111 carries out video correction to video images in the region other than the character display region specified by the region data in video images in each of the frames. Therefore, when for example a character is displayed in the present frame, video correction is carried out only to the video images other than the character in the present frame and the interpolation frame.

Note that the video corrector 111 includes a region data editor 95 and a delay unit 96 shown in FIG. 2 and can generate present frame region data PAD (FIG. 2), present compensation region data RAD (FIG. 2) and previous compensation region data FAD (FIG. 2). The video corrector 111 can specify a character display region in each frame based on these pieces of region data.

In this way, correction processing is carried out only to the video data excluding the character data in the video data output from the motion compensator 109 in this embodiment. In this way, when video correction is carried out to a frame having a character display region, the video elements (such as luminance and color) of the character can be prevented from being reflected upon the corrected video image excluding the character. Therefore, the video images (other than the character) that should be corrected can be prevented from being degraded in the picture quality.

Since video correction is not carried out to the character, the video elements of the video images other than the character can be prevented from being reflected upon the character in the frame after the video correction. In this way, the picture quality of the character can be prevented from being degraded.

Consequently, the video image in each frame can be prevented from being lowered in the picture quality.

Now, an example of the video correction carried out at the video corrector 111 will be described in detail.

Figure 14:
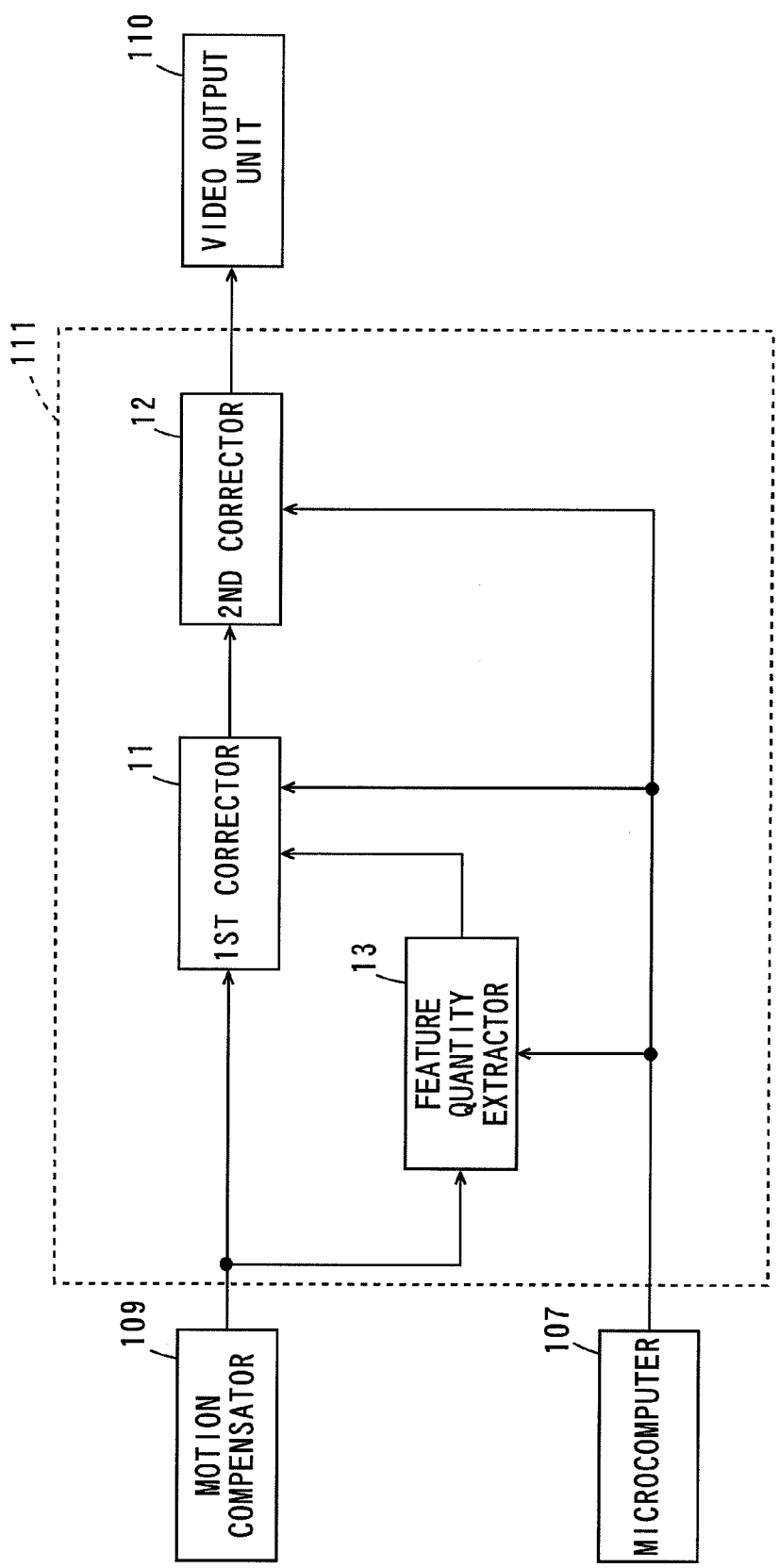
FIG. 14 is a block diagram of an example of a video corrector.

FIG. 14 is a block diagram of an example of the video corrector 111.

As shown in FIG. 14, the video corrector 111 includes a first corrector unit 11, a second corrector unit 12, and a feature quantity extractor 13.

Video data output from the motion compensator 109 is input to the first corrector unit 11 and the feature quantity extractor 13. Region data output from the microcomputer 107 is input to the first corrector unit 11, the second corrector unit 12, and the feature quantity extractor 13.

Note that the video corrector 111 shown in FIG. 14 includes a region data editor 95 (FIG. 2) and a delay unit 96 (FIG. 2) though not shown. One of present frame region data PAD (FIG. 2), present compensation region data RAD (FIG. 2) and previous compensation region data FAD (FIG. 2) is input to the first corrector unit 11, the second corrector unit 12, and the feature quantity extractor 13 as the region data.

The feature quantity extractor 13 extracts the feature quantity of the video image in each frame (such as luminance and color distribution) generated by the video data output from the motion compensator 109. More specifically, in the video images in each frame, the feature quantity extractor 13 extract the feature quantity of video images in the region other than the character display region specified by the region data. Therefore, if a character is displayed in the present frame, the feature quantity extraction is carried out only to video images other than the character in the present frame and the interpolation frame. The feature quantity extractor 13 applies the extracted feature quantity of the video images in each frame to the first corrector unit 11.

The first corrector unit 11 carries out contrast correction and brightness correction to the video images in each frame generated by the video data output from the motion compensator 109 based on the feature quantity applied from the feature quantity extractor 13. More specifically, the first correction unit 11 carries out contrast correction and brightness correction to video images in the region other than the character display region specified by the region data in the video image in each frame. Therefore, if for example a character is displayed in the present frame, only the video images other than the character are subjected to contrast correction and brightness correction in the present frame and the interpolation frame. The first corrector unit 11 outputs the corrected video data to the second corrector unit 12.

The second corrector unit 12 carries out sharpness correction to video images in each frame generated by the video data output from the first corrector unit 11. More specifically, the second corrector unit 12 carries out sharpness correction to video images in the region other than the character display region specified by the region data in the video image in each frame. Therefore, when for example a character is displayed in the present frame, the sharpness correction is carried out only to video images other than the character in the present frame and the interpolation frame. The second corrector unit 12 outputs the corrected video data to the video output unit 110.

As in the foregoing, in the video corrector 111 in the example, the feature quantity is extracted only for the video images other than characters, so that the feature quantity of the video images that should be corrected (other than the characters) can appropriately be extracted. In this way, in the first corrector unit 11, the contrast and brightness of the video images that should be corrected can appropriately be corrected.

In the first and second corrector units 11 and 12, correction is carried out only to video images other than characters. Therefore, when a frame having a character display region is subjected to video correction, the video elements of the character can be prevented from being reflected on corrected video images other than the character. Consequently, the picture quality of the video images that should be corrected can surely be prevented from being degraded.

Note that in the above-described example, the first corrector unit 11 carries out the contrast correction and the brightness correction and the second corrector unit 12 carries out the sharpness correction, but the first and second corrector units 11 and 12 may carry out other kinds of video correction such as color correction.

In the above-described example, the video corrector 111 does not carry out video correction to a character, while the video correction may be carried out to a character by setting the video correction ratio of the character to be lower than the video correction ratio of the video images other than the character. In this case, the ratio of the video elements of the character to be extracted during video correction can be lowered. In this way, the picture quality of the video images that should be corrected can be prevented from being degraded.

The above-described video corrector 111 may be applied to the television receivers 100 shown in FIGS. 1, 7, 11 and 12. In this case, the character, the sub screen image 1003 (FIG. 15), or the video images in the region excluding the outer frame part of the sub screen image 1003 are subjected to correction, so that the video elements of the character, the sub screen image 1003 or the outer frame part of the sub screen image 1003 can be prevented from being reflected upon a corrected video image in each frame. Consequently, the picture quality of the video images that should be corrected (the video images excluding the character) can be prevented from being lowered.

(8) Other Embodiments

In the above-described embodiments, frame rate conversion is carried out based on region data generated by the microcomputer 107, but the region data does not have to be generated by the microcomputer 107.

When for example a broadcasting signal transmitted from a broadcasting station includes character data or a broadcasting signal transmitted from a broadcasting station includes video data for a plurality of screen images, the broadcasting signal transmitted from the broadcasting station may include region data. In this case, the motion compensator 109 can carry out frame rate conversion based on the region data included in the broadcasting signal. In this way, the microcomputer 107 used to generate the region data is not necessary, so that the product cost for the television receiver 100 can be reduced.

Note that when the broadcasting signal transmitted from the broadcasting station includes video data for a plurality of screen images, the region data may indicate one region (such as the outer frame part of the sub screen image 1003) including the contour line of the sub screen image 1003 (see FIG. 15). In this case, the region excluding the region described above in the sub screen image 1003 is subjected to normal motion compensation similarly to the video images in the main screen image 1002. In this way, the boundary part between the main screen image 1002 and the sub screen image 1003 that should not be moved can be prevented from moving, while highly precise motion compensation can be achieved. Consequently, high picture quality video images can stably be provided.

In the embodiments described above, the television receiver 100 receives a digital broadcasting signal, but the television receiver 100 may receive an analog broadcasting signal.

In the embodiments described above, the video processor is a television receiver, while the video processor may be a mobile receiver such as a mobile telephone, an automobile TV, an automobile navigation system, and a PDA (Personal Digital Assistance).

Furthermore, the video processor may be a personal computer including a DVD (Digital Versatile Disk) reproducing device, a DVD recording/reproducing device, a hard disk recording/reproducing device, a set top box (STB), or a digital tuner. In this case, the audio output unit 105 has an audio output terminal and does not have an audio output device, and the video output unit 110 has a video output terminal and does not have a video display device. The audio output terminal and the video output terminal are connected to the audio input terminal and the video input terminal of the television receiver. Alternatively, the audio output terminal and the video output terminal are connected to the audio input terminal and the video input terminal of the display panel.

In the above-described embodiments, characters such as a channel number are presented as an OSD and a plurality of screen images are displayed on a display panel, while the same effects can be provided when other kinds of characters such as subtitles are presented or an electric program guide (EPG) is displayed in a region of the screen. In these cases, the motion compensator 109 may carry out frame rate conversion based on region data indicating the region in which the subtitles are displayed or region data indicating the region in which the electric program guide is displayed.

(9) Method of Implementing Each Element

All the elements of the television receivers 100 in the above described embodiments may be implemented by hardware such as electronic circuits or may partly be implemented by hardware such as a CPU (Central Processing Unit) and software such as programs.

(10) Correspondences between Elements in Claims and Elements in Embodiments

In the following paragraphs, non-limiting examples of correspondences between various elements recited in the claims below and those described above with respect to various preferred embodiments of the present invention are explained.

In the above-described embodiments, the video data output from the AV decoder 104 is an example of the first data, the character data or the video data output from the AV decoder 104a is an example of the second data, the superimposer 106 is an example of the superimposed data generator, the motion compensator 109 is an example of the interpolation data generator, the previous compensation video data FVD is an example of the first prediction frame data, the present compensation video data RVD is an example of the second prediction frame data, the average video data AVD is an example of the third prediction frame data, the previous compensation region data FAD is an example of the first prediction region data, the present compensation region data RAD is an example of the second prediction region data, and the region data editor 95 is an example of the prediction region data.

Various other elements having the same structures or functions as those recited in the claims may be used as the elements in the claims.

INDUSTRIAL APPLICABILITY

The present invention is effectively applicable to a television receiver, a personal computer, a DVD recorder, and the like.

The invention claimed is:

1. A video processor that processes superimposed data produced based on first data for displaying a first video image that is moved and second data for displaying a second video image that is not moved on the first video image, comprising:
   a motion vector detector that detects a motion vector from superimposed data for a plurality of frames; and
   an interpolation data generator that generates interpolation data in an interpolation frame that is to be added between two frames on a time base based on the superimposed data for the plurality of frames and the motion vector detected by said motion vector detector,
   wherein, said interpolation data generator is configured to:
   generate a first prediction frame at a point of time that is the same as a point of time for the interpolation frame by using the superimposed data for a previous frame on the time base among the two frames and the motion vector detected by said motion vector detector, without using the superimposed data for a present frame on the time base among the two frames,
   generate a second prediction frame at the point of time that is the same as the point of time for the interpolation frame by using the superimposed data for the present frame and the motion vector detected by said motion vector detector, without using the superimposed data for the previous frame,
   determine, when at least one of the first and second prediction frames includes the second video image that has been moved based on the motion vector, whether a pixel in each of the first and second prediction frames, which corresponds to a pixel in the interpolation frame, represents an outer peripheral part of the second video image that has been moved,
   select, when the pixel in one of the first and second prediction frames represents the outer peripheral part, and the pixel in the other of the first and second prediction frames does not represent the outer peripheral part, data of the pixel in the other prediction frame, as interpolation data of the pixel in the interpolation frame, and
   select, when the pixel in each of the first and second prediction frames represents the outer peripheral part, data acquired by calculation using the superimposed data for the previous and present frames as the interpolation data of the pixel in the interpolation frame.

2. The video processor according to claim 1, wherein when the second video image is displayed at least in one of the two frames, said interpolation data generator generates interpolation data for all the regions of the interpolation frame, without using the motion vector detected by said motion vector detector.

3. The video processor according to claim 1, wherein when the second video image is displayed at least in one of the two frames, said interpolation data generator generates the second data, without using the motion vector detected by said motion vector detector, as interpolation data for a region in the interpolation frame corresponding to the outer peripheral part of the display region for the second video image.

4. The video processor according to claim 1, wherein said interpolation data generator determines the region corresponding to the outer peripheral part based on region data, indicating the display region for the second video image in each frame.

5. The video processor according to claim 1, further comprising a prediction region data generator that generates first prediction region data indicating the display region for the second video image in the first prediction frame based on region data indicating the display region for the second video image in the previous frame and the motion vector detected by the motion vector detector, and second prediction region data indicating the display region for the second video image in the second prediction frame based on region data indicating the display region for the second video image in the present frame and the motion vector detected by said motion vector detector,
   wherein said interpolation data generator generates interpolation data based on the first and second prediction region data generated by said prediction region data generator.

6. The video processor according to claim 1, wherein the second data is data for an on screen display, and
   the region of the outer peripheral part comprises all the regions for the on screen display.

7. A video processor that processes first data for displaying a first video image that is moved and second data for displaying a second video image that is not moved, comprising:
   a superimposed data generator that generates superimposed data for a plurality of frames in which the second video image is displayed on the first video image by superimposing the second data on the first data;

a motion vector detector that detects a motion vector from the first data for the plurality of frames; and an interpolation data generator that generates interpolation data in an interpolation frame that is to be added between two frames on a time base based on the superimposed data for the plurality of frames generated by said superimposed data generator and the motion vector detected by said motion vector detector, wherein said interpolation data generator is configured to:

generate a first prediction frame at a point of time that is the same as a point of time for the interpolation frame by using the superimposed data for a previous frame on the time base among the two frames and the motion vector detected by said motion vector detector, without using the superimposed data for a present frame on the time base among the two frames, generate a second prediction frame at the point of time that is the same as the point of time for the interpolation frame by using the superimposed data for the present frame and the motion vector detected by said motion vector detector, without using the superimposed data for the previous frame, determine, when at least one of the first and second prediction frames includes the second video image that has been moved based on the motion vector, whether a pixel in each of the first and second prediction frames, which corresponds to a pixel in the interpolation frame, represents an outer peripheral part of the second video image that has been moved, select, when the pixel in one of the first and second prediction frames represents the outer peripheral part, and the pixel in the other of the first and second prediction frames does not represent the outer peripheral part, data of the pixel in the other prediction frame, as interpolation data of the pixel in the interpolation frame, and select, when the pixel in each of the first and second prediction frames represents the outer peripheral part, data acquired by calculation using the superimposed data for the previous and present frames as the interpolation data of the pixel in the interpolation frame.

8. The video processor according to claim 7, wherein when the second video image is displayed at least in one of the two frames, said interpolation data generator generates interpolation data for a region in the interpolation frame corresponding to the display region for the second video image, without using the motion vector detected by said motion vector detector.

9. The video processor according to claim 7, wherein when the second video image is displayed at least in one of the two frames, said interpolation data generator generates interpolation data for all the regions of the interpolation frame without using the motion vector detected by said motion vector detector.

10. The video processor according to claim 9, wherein when the second video image is displayed at least in one of the two frames, said interpolation data generator generates the second data, as interpolation data in a region corresponding to the display region for the second video image in the interpolation frame.

11. The video processor according to claim 8, wherein said interpolation data generator determines a region corresponding to the display region for the second video image based on region data indicating the display region for the second video image in each frame.

12. The video processor according to claim 7, further comprising a prediction region data generator that generates first prediction region data indicating the display region for the second video image in the first prediction frame based on region data indicating the display region for the second video image in the previous frame and the motion vector detected by said motion vector detector, and second prediction region data indicating the display region for the second video image in the second prediction frame based on region data indicating the display region for the second video image in the present frame and the motion vector detected by said motion vector detector, wherein said interpolation data generator generates interpolation data based on the first and second prediction region data generated by said prediction region data generator.

13. The video processor according to claim 7, wherein the second data is data for an on screen display.

14. A video processing method for processing superimposed data produced based on first data for displaying a first video image that is moved and second data for displaying a second video image that is not moved on the first video image, the method comprising:

detecting a motion vector from superimposed data for a plurality of frames; and generating interpolation data in an interpolation frame that is to be added between two frames on a time base based on the superimposed data for the plurality of frames and the motion vector, wherein the generating of the interpolation data comprises:

generating a first prediction frame at a point of time that is the same as a point of time for the interpolation frame by using the superimposed data for a previous frame on the time base among the two frames and the detected motion vector, without using the superimposed data for a present frame on the time base among the two frames, generating a second prediction frame at the point of time that is the same as the point of time for the interpolation frame by using the superimposed data for the present frame and the detected motion vector, without using the superimposed data for the previous frame, determining, when at least one of the first and second prediction frames includes the second video image that has been moved based on the motion vector, whether a pixel in each of the first and second prediction frames, which corresponds to a pixel in the interpolation frame, represents an outer peripheral part of the second video image that has been moved, selecting, as a result of the determination, when the pixel in one of the first and second prediction frames represents the outer peripheral part, and the pixel in the other of the first and second prediction frames does not represent the outer peripheral part, data of the pixel in the other prediction frame, as interpolation data of the pixel in the interpolation frame, and selecting, as a result of the determination, when the pixel in each of the first and second prediction frames represents the outer peripheral part, data acquired by calculation using the superimposed data for the previous and present frames as the interpolation data of the pixel in the interpolation frame.

15. A video processing method for processing first data for displaying a first video image that is moved and second data for displaying a second video image that is not moved, the method comprising:

generating superimposed data for a plurality of frames in which the second video image is displayed on the first video image by superimposing the second data on the first data;

detecting a motion vector from the first data for the plurality of frames; and generating interpolation data in an interpolation frame that is to be added between two frames on a time base based on the superimposed data for the plurality of frames and the motion vector, generating a first prediction frame at a point of time that is the same as a point of time for the interpolation frame by using the superimposed data for a previous frame on the time base among the two frames and the detected motion vector, without using the superimposed data for a present frame on the time base among the two frames, generating a second prediction frame at the point of time that is the same as the point of time for the interpolation frame by using the superimposed data for the present frame and the detected motion vector, without using the superimposed data for the previous frame, determining, when at least one of the first and second prediction frames includes the second video image that has been moved based on the motion vector, whether a pixel in each of the first and second prediction frames, which corresponds to a pixel in the interpolation frame, represents an outer peripheral part of the second video image that has been moved, selecting, as a result of the determination, when the pixel in one of the first and second prediction frames represents the outer peripheral part, and the pixel in the other of the first and second prediction frames does not represent the outer peripheral part, data of the pixel in the other prediction frame, as interpolation data of the pixel in the interpolation frame, and selecting, as a result of the determination, when the pixel in each of the first and second prediction frames represents the outer peripheral part, data acquired by calculation using the superimposed data for the previous and present frames as the interpolation data of the pixel in the interpolation frame.

* * * * *